(12) United States Patent
Kim et al.

(10) Patent No.: US 7,847,907 B2
(45) Date of Patent: Dec. 7, 2010

(54) DISPLAY SUBSTRATE, METHOD OF FABRICATING THE SAME, AND LIQUID CRYSTAL DISPLAY DEVICE HAVING THE SAME

(75) Inventors: In-Woo Kim, Suwon-si (KR); Dong-Gyu Kim, Yongin-si (KR); Jeong-Ho Lee, Seoul (KR); Young-Goo Song, Cheonan-si (KR); Hyun Park, Cheonan-si (KR); Min-Wook Park, Seongnam-si (KR); In-Ho Park, Cheonan-si (KR); Yong-Woo Lee, Seoul (KR); Min-Hyung Choo, Seongnam-si (KR); Kyung-Suk Jung, Iksan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 422 days.

(21) Appl. No.: 11/753,249

(22) Filed: May 24, 2007

(65) Prior Publication Data

US 2007/0279542 A1    Dec. 6, 2007

(30) Foreign Application Priority Data

May 24, 2006   (KR)   ............... 10-2006-0046551
Jul. 28, 2006   (KR)   ............... 10-2006-0071630

(51) Int. Cl.
*G02F 1/1343* (2006.01)
(52) U.S. Cl. .............................. 349/144; 349/146
(58) Field of Classification Search ............... 349/144, 349/146
See application file for complete search history.

(56) References Cited

U.S. PATENT DOCUMENTS

2006/0186913 A1* 8/2006 Kim ..................... 324/770

2006/0209242 A1* 9/2006 Sohn et al. ............... 349/139
2007/0146563 A1* 6/2007 Yun et al. ................ 349/36

(Continued)

FOREIGN PATENT DOCUMENTS

CN    1637593 A    7/2005

(Continued)

OTHER PUBLICATIONS

English Language Abstract, KR Patent First Publication No. 1020050001707, Jan. 7, 2005, 1 page.

(Continued)

*Primary Examiner*—Michelle R Connelly Cushwa
(74) *Attorney, Agent, or Firm*—Innovation Counsel LLP

(57) ABSTRACT

A display substrate, a method of fabricating the same, and a liquid crystal display apparatus having the same. The display substrate includes a storage electrode extending over first and second areas formed on a substrate, a insulating layer pattern formed on the storage electrode, and first and second pixel electrodes formed on the insulating layer pattern. At least one of the first and second pixel electrodes has at least one recess. The insulating layer pattern has first and second openings formed in the first and second areas corresponding to the storage electrode. Accordingly, electric short circuits between the first and second pixel electrodes is prevented due to the recess or the openings during the manufacturing process for the first and second pixel electrodes.

23 Claims, 23 Drawing Sheets

U.S. PATENT DOCUMENTS

2009/0066870 A1 * 3/2009 Yagi et al. .................. 349/40

FOREIGN PATENT DOCUMENTS

| | | |
|---|---|---|
| JP | 11-337963 | 12/1999 |
| JP | 2001-142095 | 5/2001 |
| JP | 2003-207798 | 7/2003 |
| JP | 2004-093654 | 3/2004 |
| JP | 2005-049899 | 2/2005 |
| JP | 2005-049907 | 2/2005 |
| KR | 1020010039261 | 5/2001 |
| KR | 1020050001707 | 1/2005 |
| KR | 1020060003609 | 1/2006 |

OTHER PUBLICATIONS

English Language Abstract, KR Patent First Publication No. 1020060003609, Jan. 11, 2006, 1 page.

English Language Abstract, KR Patent First Publication No. 1020010039261, May 15, 2001, 1 page.

English Language Abstract, JP Patent First Publication No. 2003-207798, Jul. 25, 2003, 1 page.

English Language Abstract, JP Patent First Publication No. 2005-049907, Feb. 24, 2005, 1 page.

English Language Abstract, JP Patent First Publication No. 2005-049899, Feb. 24, 2005, 1 page.

English Language Abstract, JP Patent First Publication No. 2004-093654, Mar. 25, 2004, 1 page.

English Language Abstract, JP Patent First Publication No. 2001-142095, May 25, 2001, 1 page.

English Language Abstract, JP Patent First Publication No. 11-337963, Dec. 10, 1999, 1 page.

* cited by examiner

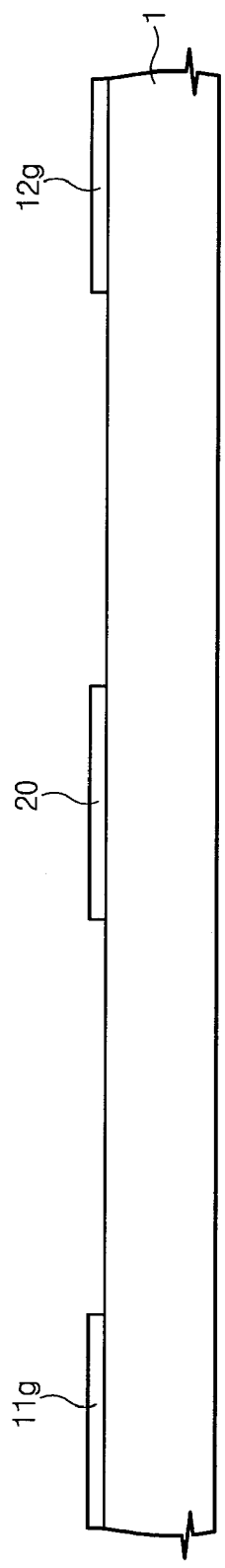
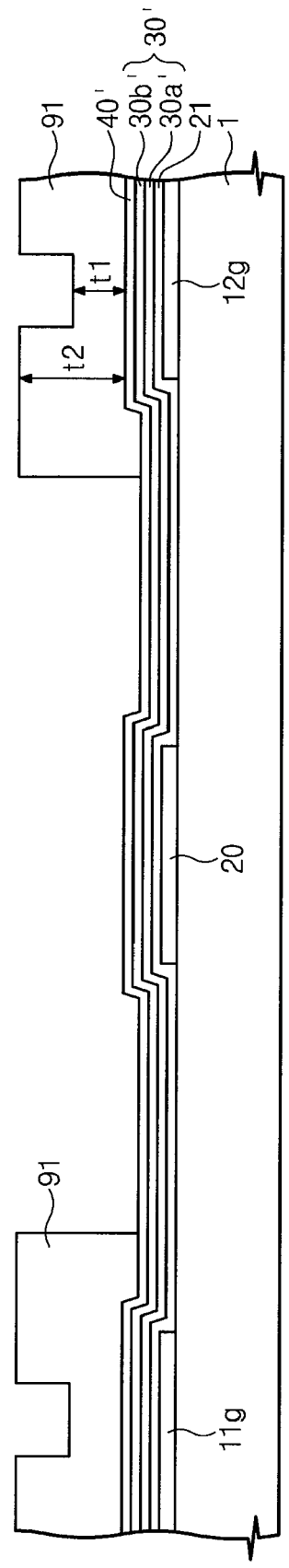

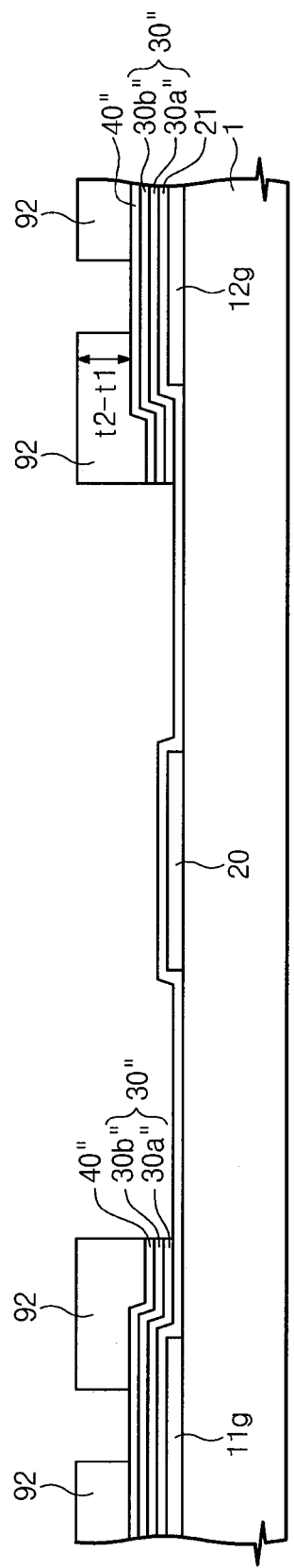
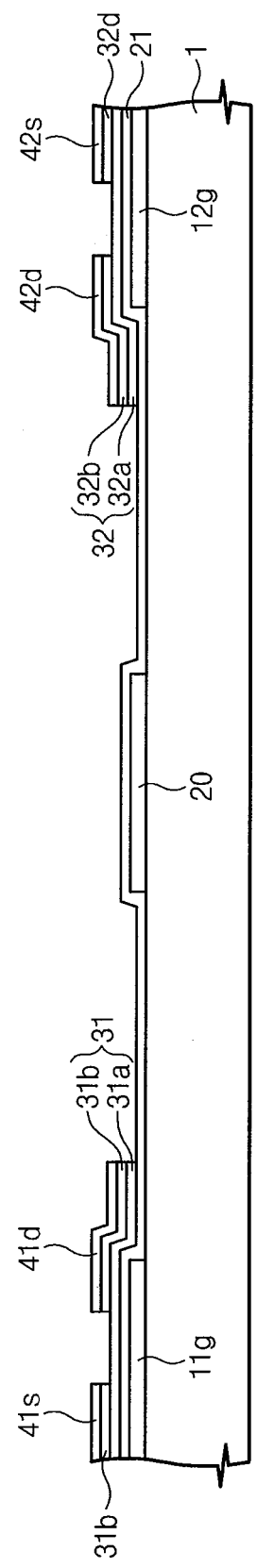

DISPLAY SUBSTRATE, METHOD OF FABRICATING THE SAME, AND LIQUID CRYSTAL DISPLAY DEVICE HAVING THE SAME

CROSS-REFERENCE TO RELATED APPLICATION

This application relies for priorities upon Korean Patent Application Nos. 2006-46551 and 2006-71630 filed on May 24, 2006 and Jul. 28, 2006, respectively, the contents of which are herein incorporated by reference in their entireties.

BACKGROUND OF THE INVENTION

1. Field of the Invention

The present invention relates to a liquid crystal display device capable of displaying high-quality images having an improved display substrate manufacturable with fewer process faults.

2. Description of the Related Art

In general, a display device such as a liquid crystal display device, a plasma display device, or an organic electroluminescent device, includes a substrate upon which a plurality of pixel areas are defined.

Each pixel has a pixel electrode to which a voltage that corresponds to an image to be displayed is applied. The pixel electrode is obtained by patterning a transparent conductive layer after depositing the transparent conductive layer on the substrate. An interlayer, such as an insulating layer, can be interposed between the substrate and the pixel electrode. However, if the interlayer has a stepped portion on a surface thereof, the pixel electrode may represent a defect due to the stepped portion.

SUMMARY OF THE INVENTION

According to one aspect of the present invention, a liquid crystal display device capable of displaying high-quality images employs a display substrate that includes a storage electrode, a insulating layer pattern, and first and second pixel electrodes. The storage electrode extends over first and second areas formed on the substrate. The insulating layer pattern is formed on the storage electrode to cover the substrate and has an opening at an area corresponding to the storage electrode. The first and second pixel electrodes are formed on the insulating layer pattern and positioned on the first and second areas, respectively. At least one of the first and second pixel electrodes has at least one recess at an area corresponding to the storage electrode.

According to another aspect of the present invention, a display substrate includes a storage electrode, a insulating layer pattern, and first and second pixel electrodes.

The storage electrode extends over first and second areas formed on a substrate. The insulating layer pattern is formed on the storage electrode, and has first and second openings at first and second areas corresponding to the storage electrode. The first and second pixel electrodes are formed on the insulating layer pattern and positioned on the first and second areas, respectively.

In still another aspect of the present invention, a method of fabricating the display substrate is provided. According to the method, a storage electrode is formed to extend over first and second areas of a substrate. Then, a gate electrode is formed on the substrate spaced apart from the storage electrode, and source and drain electrodes are formed on the gate electrode spaced apart from each other. A insulating layer pattern is formed on the source and drain electrodes having an opening at an area corresponding to the storage electrode. First and second pixel electrodes are formed on the insulating layer pattern and positioned on the first and second areas, respectively. At least one of the first and second pixel electrodes has at least one recess at an area corresponding to the storage electrode.

According to still another aspect of the present invention, a method of fabricating the display substrate comprises forming a storage electrode on a substrate having first and second areas such that the storage electrode extends over the first and second areas of the substrate. Then, a gate electrode is formed on the substrate such that the gate electrode is spaced apart from the storage electrode, and source and drain electrodes are formed on the gate electrode such that the source and drain electrodes are spaced apart from each other. A insulating layer pattern is formed on the source and drain electrodes such that the insulating layer pattern has first and second openings at the first and second areas corresponding to the storage electrode. First and second pixel electrodes are formed on the insulating layer pattern corresponding to the first and second areas, respectively.

According to yet another aspect of the present invention, a liquid crystal display device includes first and second substrates, a liquid crystal layer, a storage electrode, a insulating layer pattern, a pixel electrode, and a common electrode. The first and second substrates face each other. The liquid crystal layer includes liquid crystal and is interposed between the first and second substrates. The storage electrode is formed on the first substrate. The insulating layer pattern is formed on the storage electrode, and has an opening at an area corresponding to the storage electrode. The pixel electrode is formed on the insulating layer pattern. The common electrode is formed on the second substrate and has a direction controller that controls an alignment direction of the liquid crystal. The direction controller has a pair of portions symmetrically positioned at brink portions of the storage electrode while extending in parallel to a length direction of the storage electrode.

BRIEF DESCRIPTION OF THE DRAWINGS

The above and other advantages of the present invention will become readily apparent by reference to the following detailed description when considered in conjunction with the accompanying drawings, in which:

FIGS. 4A to 4G are sectional views illustrating the procedure of manufacturing the display substrate in FIG. 3B;

DESCRIPTION OF THE EMBODIMENTS

Figure 1A:
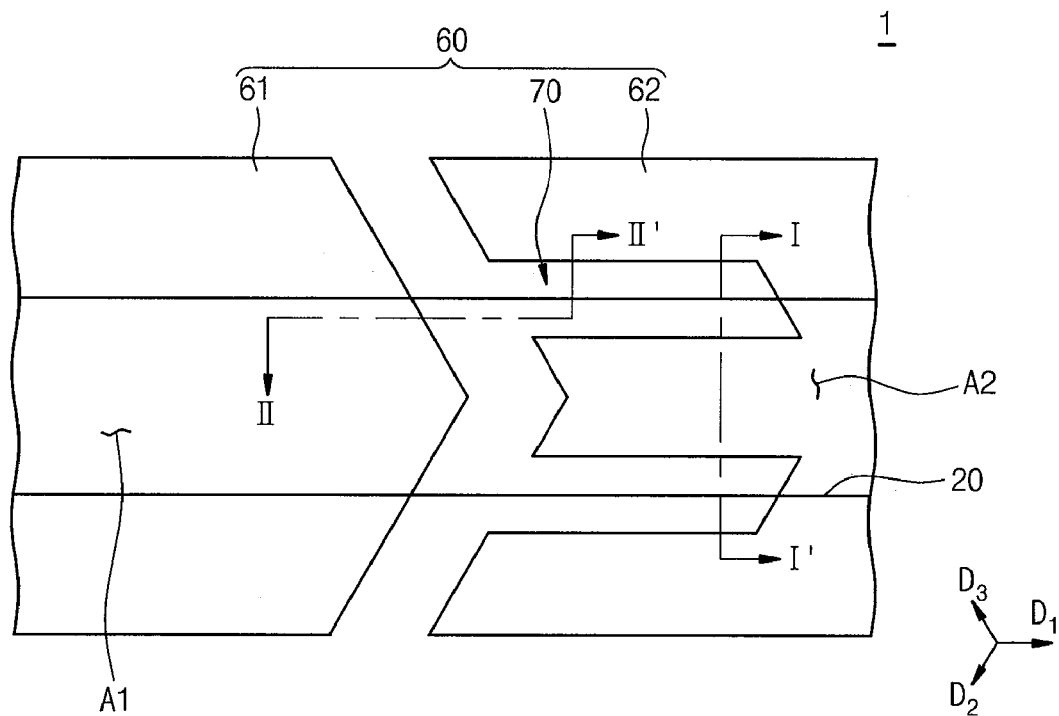
FIG. 1A is a plan view illustrating a display substrate according to an exemplary embodiment of the present invention.

FIG. 1A is a plan view illustrating a display substrate according to an exemplary embodiment of the present invention.

Referring to FIG. 1A the display substrate 1 has a first area A1 and a second area A2. A storage electrode 20 and a pixel electrode 60 are formed on the display substrate 1. The storage electrode 20 extends through the first and second areas A1 and A2.

The pixel electrode 60 includes first and second pixel electrodes 61 and 62, which are spaced apart from each other and positioned on the first and second areas A1 and A2, respectively. The pixel electrode 60 is aligned corresponding to a pixel area, which is a basic area in order to display the image. The first and second pixel electrodes 61 and 62 may belong to different pixel areas or the same pixel area. If the first and second pixel electrodes 61 and 62 belong to the different pixel areas, the first and second pixel electrodes 61 and 62 may receive different voltages representing different image information. If the first and second pixel electrodes 61 and 62 belong to the same pixel area, they may receive different voltages that represent the same image information and which are compensated for each other to display high-quality images.

If a lengthwise direction of the storage electrode 20 is assumed as a first direction D1, the pixel electrode 60 is oriented with respect to the first direction D1 having branches oriented in second and third directions D2 and D3 that are symmetrical to each other. At the boundary area between the first and second areas A1 and A2, the first pixel electrode 61 has a convex portion that protrudes in the first direction D1 and the second pixel electrode 62 has a concave portion that is recessed in the first direction corresponding to the convex portion. A recess 70, which extends in the first direction D1, is formed in the concave portion of the second pixel electrode 62. Preferably, a pair of recesses 70 are provided at both brink portions of the storage electrode 20 in opposition to each other.

The first pixel electrode 61 may have a concave portion formed with the recess 70 while the second pixel electrode 62 may have a convex portion so long as there is at least one recess that need not be limited to any particular shape or number thereof.

When the display substrate of the present invention is used for a liquid crystal display device, a pair of recesses 70 are preferably formed at the edge portions of storage electrode 20 for ease in controlling the alignment of the liquid crystal, as will be described later in detail.

Figure 1B:
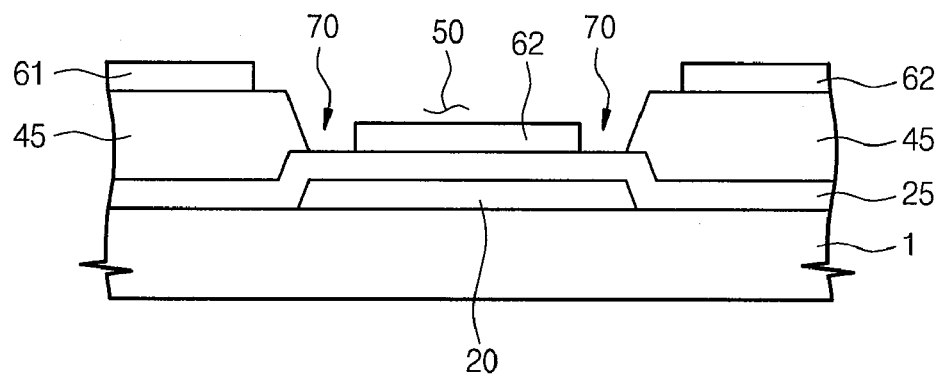
FIG. 1B is a sectional view taken along line I-I' shown in FIG. 1A.

FIG. 1B is a sectional view taken along line I-I' shown in FIG. 1A. Referring to FIG. 1B, an insulating layer is formed on the storage electrode 20. The insulating layer has a dual-layered structure, in which a lower layer includes a transparent inorganic layer 25 covering the storage electrode 20 and an upper layer includes a transparent organic layer 45 that is patterned on the storage electrode 20 such that an opening 50 can be formed in the upper layer. The pixel electrode 60 is formed on the transparent organic layer 45.

Figure 1C:
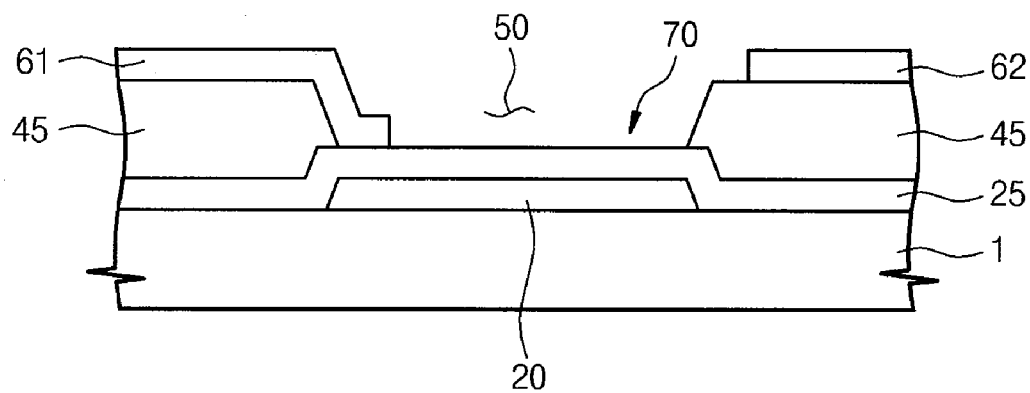
FIG. 1C is a sectional view taken along line II-II' shown in FIG. 1A.

FIG. 1C is a sectional view taken along line II-II' shown in FIG. 1A. The first and second pixel electrodes 61 and 62 are formed on the storage electrode 20 while being spaced apart from each other. The space between the first and second pixel electrodes 61 and 62 may be increased by the presence of a recess 70. Since the space between electrodes 61 and 62 is increased by the recess 70, an electric short between the first and second pixel electrodes 61 and 62 can be prevented when forming the pixel electrode 60, as will be described in detail below with reference to a method of manufacturing the display substrate having the above structure.

Figure 2A:
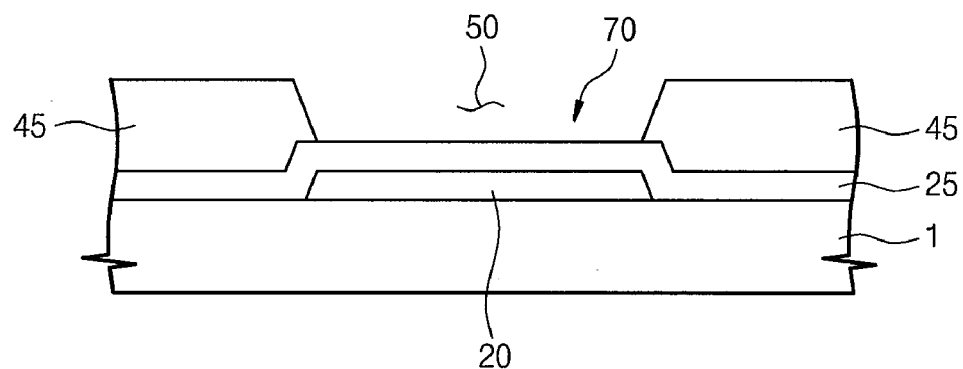
FIGS. 2A to 2D are sectional views illustrating the procedure of manufacturing the display substrate in FIG. 1C.
Figure 2B:
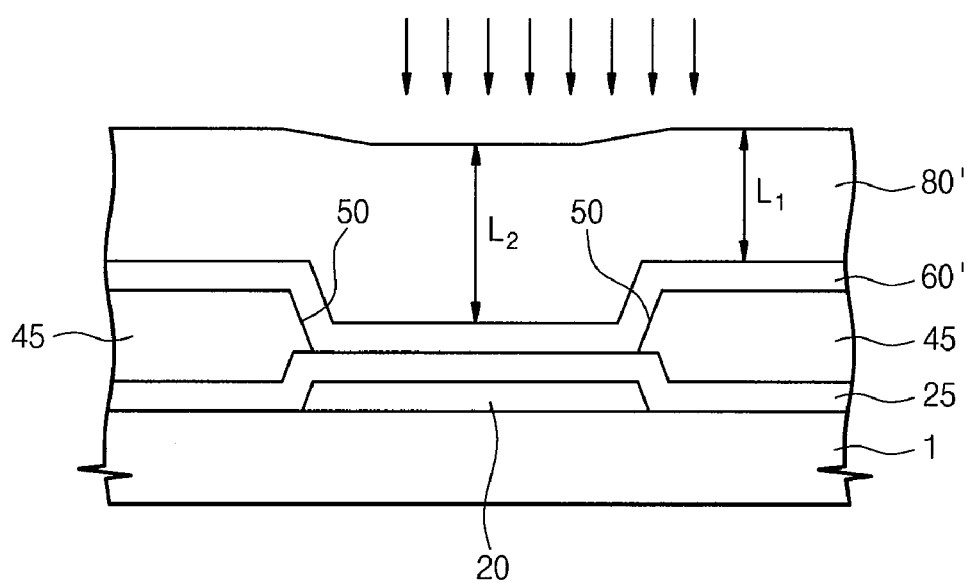

FIGS. 2A to 2D are sectional views illustrating a procedure for manufacturing the display substrate shown in FIG. 1C. Referring to FIG. 2A, the storage electrode 20 is formed on a display substrate 1. The storage electrode 20 can be obtained by etching a conductive layer formed by depositing a metal such as copper (Cu), aluminum (Al), silver (Ag) or chrome (Cr), or an alloy thereof. An inorganic layer 25 is formed on the storage electrode 20, for example through a plasma chemical vapor deposition process using silicon nitride so that layer 25 covers the entire surface of substrate 1. An organic layer 45 is formed on inorganic layer 25. Acrylic resin can be used for the organic layer 45. The acrylic resin is coated and patterned on the inorganic layer 25 so that an opening 50 is formed in layer 45. Referring to FIG. 2B, a transparent conductive layer 60' is formed on the organic layer 45. The transparent conductive layer 60' can be obtained by depositing indium zinc oxide (IZO) or indium tin oxide (ITO) through sputtering. In this case, the transparent conductive layer 60' is deposited with a uniform thickness; however its surface height is steps down near the opening 50. A photoresist film 80' is coated on the transparent conductive layer 60' through a spin coating scheme that results in the thickness of the photoresist film 80' being irregularly formed.

An exposure process is then performed with regard to the photoresist film 80'. If a positive type photoresist film is used, a predetermined portion of the photoresist film 80' that corresponds to a portion of the transparent conductive layer 60' to be removed is exposed to light. The light that reaches the exposure area of the photoresist film 80' has uniform intensity (see, arrows in FIG. 2B), but the thickness of the photoresist film 80' is irregular. Accordingly, the light may not reach the bottom of the photoresist film 80' in a portion of the photoresist film 80' having the greater thickness.

For instance, in the portion where the inorganic layer 45 is formed, the light path corresponds to "L1". In addition, in the portion where the opening 50 is formed, the light path corresponds to "L2" which is longer than "L1".

Figure 2C:
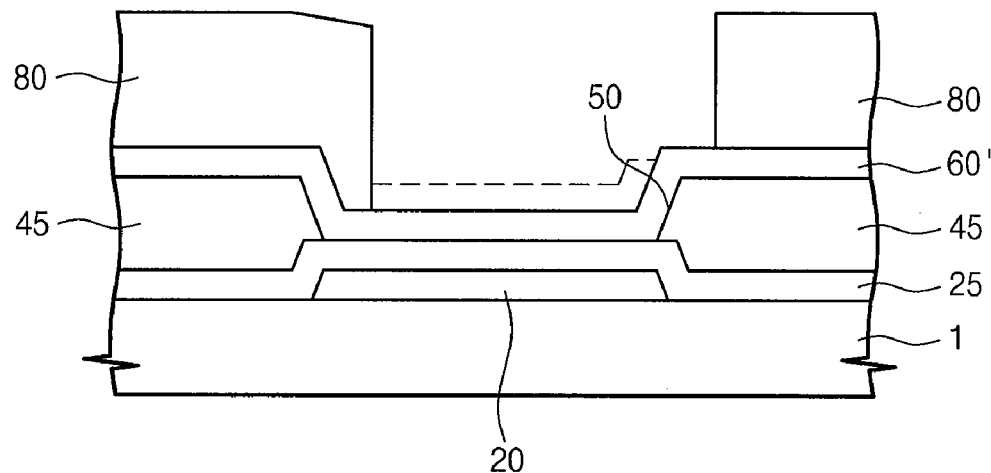

Referring to FIG. 2C, the exposed portion of the photoresist film 80' is removed by means of a developer, so that a photoresist film pattern 80 is formed. Due to the photoresist film pattern 80, a portion the transparent conductive layer 60' is exposed.

Dotted lines shown in FIG. 2C represent the residue of the photoresist film 80' that may remain on the transparent conductive layer 60' because the light does not reach the bottom of the photoresist film 80' in the exposure process.

Figure 2D:
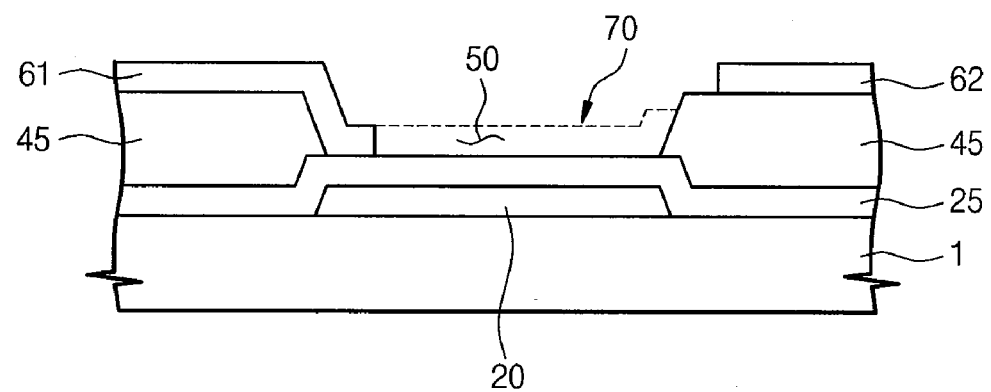

Referring to FIG. 2D, the transparent conductive layer 60' is etched by using the photoresist film pattern 80 as an etch mask, thereby forming the pixel electrode 60 including the first and second pixel electrodes 61 and 62 which are spaced apart from each other. The recess 70 is formed during the etching process, providing an interval or space between the first and second pixel electrodes 61 and 62.

Dotted lines shown in FIG. 2D represent the residue of the transparent conductive layer 60' that may remain below the photoresist film 80' because the light does not reach the bottom of the photoresist film 80' in the exposure process. This portion may overlap an area where the recess 70 is formed. Thus, if the recess 70 is not formed, the first and second pixel electrodes 61 and 62 are interconnected so that an electric short circuit may occur between the first and second pixel electrodes 61 and 62. That is, the recess 70 prevents the electric short between the first and second pixel electrodes 61 and 62 when forming the pixel electrode 60, thereby preventing a process fault.

Figure 3A:
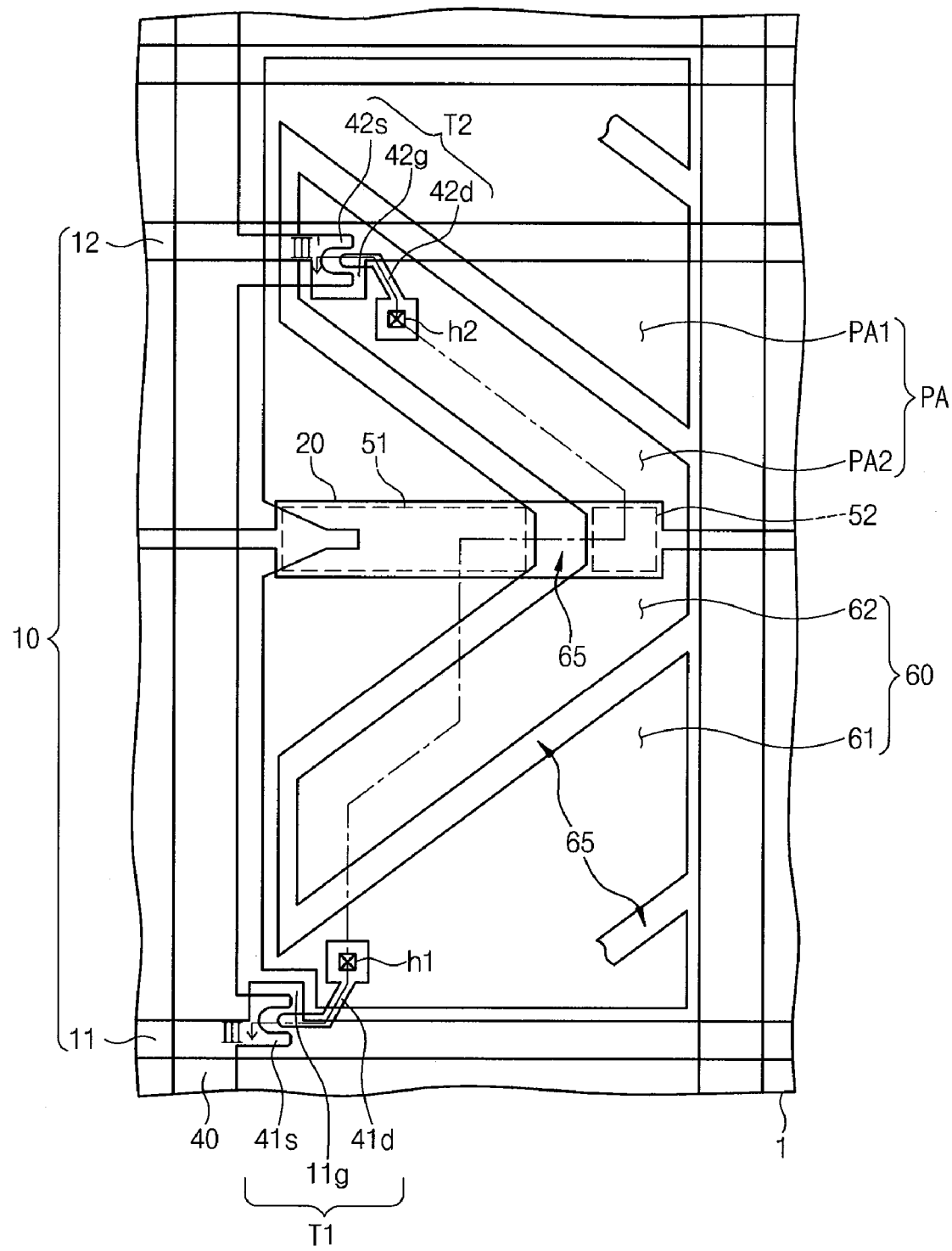
FIG. 3A is a plan view illustrating a display substrate according to another exemplary embodiment of the present invention.

FIG. 3A is a plan view illustrating a display substrate according to another exemplary embodiment of the present invention.

Referring to FIG. 3A, gate line 10, data lines 40, thin film transistors T1 and T2, and pixel electrode 60 are formed on the display substrate 1. The gate line 10 cross the data line 40 on the display substrate 1, thereby forming a plurality of pixel areas PAs. The pixel areas PAs have the same structure, so the following description will be focused on one pixel area PA.

The pixel area PA is divided into a first area PA1 and a second area PA2 and the pixel electrode 60 includes first and second pixel electrodes 61 and 62 corresponding to the first and second areas PA1 and PA2. That is, the first pixel electrode 61 is aligned on the first area PA1 and the second pixel electrode 62 is aligned on the second area PA2 while being spaced apart from the first pixel electrode 61. A predetermined portion of the first pixel electrode 61 is cut away so that the pixel electrode 60 has a cutting pattern 65 formed between the cutting part and the first and second pixel electrodes 61 and 62.

A voltage is applied to the pixel electrode 60. Different voltages may be applied to the first and second pixel electrodes 61 and 62 such that the operational characteristics of the first and second pixel electrodes 61 and 62 can be compensated. To this end, first and second thin film transistors T1 and T2 corresponding to the first and second pixel electrodes 61 and 62, respectively are provided.

The first thin film transistor T1 includes a first gate electrode 11g, a first source electrode 41s and a first drain electrode 41d. The gate line 10 includes a first gate line 11 and a second gate line 12. The first gate electrode 11g branches from the first gate line 11. The first source electrode 41s branches from the data line 40. The first drain electrode 41d is spaced apart from the first source electrode 41s and is electrically connected to the first pixel electrode 61 through a first contact hole h1.

The second thin film transistor T2 includes a second gate electrode 12g, a second source electrode 42s and a second drain electrode 42d. The second gate electrode 12g branches from the second gate line 12. The second source electrode 42s branches from the data line 40. The second drain electrode 42d is spaced apart from the second source electrode 42s and is electrically connected to the second pixel electrode 62 through a second contact hole h2.

The storage electrode 20 is formed at the center of the pixel area PA. The storage electrode 20 extends over the first and second pixel areas PA1 and PA2. A insulating layer pattern (see, reference numeral 50 in FIG. 3B) is formed on the storage electrode 20 so as to cover the entire surface of the display substrate 1. The insulating layer pattern has openings 51 and 52 formed on the storage electrode 20. The openings 51 and 52 include the first opening 51 positioned in the first area PA1 and the second opening 52 positioned in the second area PA2. The insulating layer pattern, except for the first and second openings 51 and 52, covers a predetermined portion of the storage electrode 20 as well as the boundary area between the first and second pixel electrodes 61 and 62.

Figure 3B:
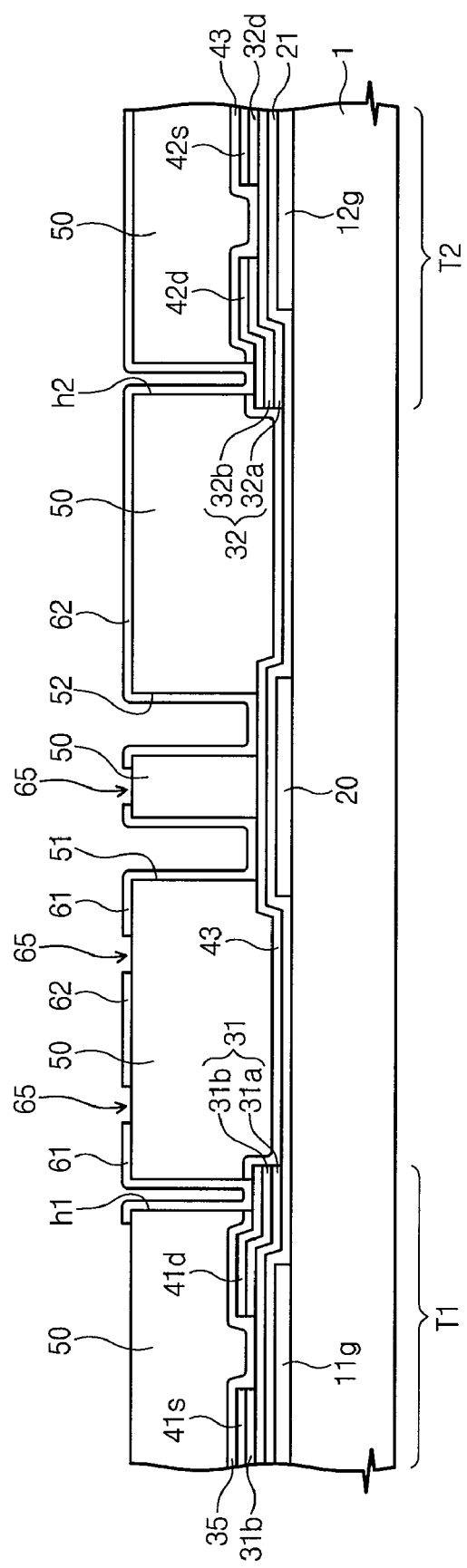
FIG. 3B is a sectional view taken along line III-III' shown in FIG. 3A.

FIG. 3B is a sectional view taken along line III-III' shown in FIG. 3A.

Referring to FIG. 3B, the first gate electrode 11g, the storage electrode 20 and the second gate electrode 12g are formed on the predetermined portion of the display substrate 1 while being spaced apart from each other. A gate-insulting layer 21 is formed on the first gate electrode 11g, the storage electrode 20 and the second gate electrode 12g in such a manner that the gate-insulating layer 21 can cover the entire surface of the display substrate 1.

A first semiconductor pattern 31, the first source electrode 41s and the first drain electrode 41d are formed on the gate-insulating layer 21. The first semiconductor pattern 31, the first source electrode 41s and the first drain electrode 41d cover the first gate electrode 11g and constitute the first thin film transistor T1. The first semiconductor pattern 31 includes a first active pattern 31a and a first ohmic contact pattern 31b formed on the first active pattern 31a. The first ohmic contact pattern 31b is divided along the first source electrode 41s and the first drain electrode 41d.

In addition, a second semiconductor pattern 32, the second source electrode 42s and the second drain electrode 42d are formed on the gate-insulating layer 21. The second semiconductor pattern 32, the second source electrode 42s and the second drain electrode 42d cover the second gate electrode 12g and constitute the second thin film transistor T2. The second semiconductor pattern 32 includes a second active pattern 32a and a first second contact pattern 32b formed on the second active pattern 32a. The second ohmic contact pattern 32b is divided along the second source electrode 42s and the second drain electrode 42d.

A passivation layer 43 is formed on the first and second thin film transistors T1 and T2 such that the passivation layer 43 covers the entire surface of the display substrate 1. A insulating layer pattern 50 is formed on the passivation layer 43. The passivation layer 43 and the insulating layer pattern 50 have first and second contact holes h1 and h2. A predetermined area of the first drain electrode 41d is exposed through the first contact hole h1 and a predetermined area of the second drain electrode 42d is exposed through the second contact hole h2.

The pixel electrode 60 is formed on the insulating layer pattern 50. The first pixel electrode 61 is formed on the first area PA1 and is electrically connected to the first thin film transistor T1. The second pixel electrode 62 is formed on the second area PA2 and is electrically connected to the second thin film transistor T2. The insulating layer pattern 50 covers the storage electrode 20 in a boundary area between the first and second pixel electrodes 61 and 62.

The gate-insulating layer 21 and the passivation layer 43 are formed between the storage electrode 20 and the first and second pixel electrodes 61 and 62, thereby forming a storage capacitor. The insulating layer pattern 50 has a thickness of about few micrometers. Since a predetermined portion of the insulating layer pattern 50 is removed at an area where the openings 51 and 52 are formed, the interval or gap between the storage electrode 20 and the first and second pixel electrodes 61 and 62 may be reduced. As a result, the capacitance of the storage capacitor may increase, improving the operational characteristics of the storage capacitor. Hereinafter, a method of fabricating the display substrate having the above structure will be described.

FIGS. 4A to 4G are sectional views illustrating the procedure of manufacturing the display substrate in FIG. 3B.

Referring to FIG. 4A, a gate conductive layer is formed on the display substrate 1 and then the gate conductive layer is patterned to form the first gate electrode 11g, the storage electrode 20 and the second gate electrode 12g. The gate conductive layer can be obtained by depositing a metal including copper (Cu), aluminum (Al), silver (Ag) or chrome (Cr), or an alloy thereof. The gate conductive layer can be etched through a wet etching process using an etchant.

Referring to FIG. 4B, the gate insulating layer 21 is formed on the first gate electrode 11g, the storage electrode 20 and the second gate electrode 12g. The gate-insulating layer 21 is formed through a plasma chemical vapor deposition process using inorganic compound, such as silicon nitride, such that the gate-insulating layer 21 covers the entire surface of the display substrate 1.

A semiconductor layer 30' and a data conductive layer 40' are formed on the gate-insulating layer 21. The semiconductor layer 30' can be formed through a plasma chemical vapor deposition process using an amorphous silicon layer such that the semiconductor layer 30' covers the entire surface of the display substrate 1. The semiconductor layer 30' includes an active layer 30a' and an ohmic contact layer 30b' formed on the active layer 30a'. The ohmic contact layer 30b' includes dopants. The method of forming the data conductive layer 40' is similar to that of the gate conductive layer.

A first photoresist film pattern 91 is formed on the data conductive layer 40'. In order to obtain the first photoresist film pattern 91, a photoresist film is formed on the data conductive layer 40' and then the exposure and development process is performed with respect to the photoresist film.

The first photoresist film layer pattern 91 has a variable thickness. That is, the first photoresist film layer pattern 91 has a first thickness t1 at the first and second gate electrodes 11g and 12g and a second thickness t2 near the brink portion of the first and second gate electrodes 11g and 12g. The second thickness t2 is greater than the first thickness t1. The data conductive layer 40' formed on the storage electrode 20 is exposed through the first photoresist film pattern 91.

In order that the photoresist film pattern 91 have a variable thickness, a slit mask or a halftone photo mask is used in the exposure process. The slit mask or the halftone mask has a transmissive area, a non-transmissive area and an intermediate area. In the intermediate area, an interval between the slits is adjusted or a halftone material is used such that the light can partially pass through the intermediate area, so the photoresist film is exposed by the light partially passed. As a result, a photoresist film pattern having a mean thickness is formed at an area corresponding to the intermediate area.

Referring to FIG. 4C, the data conductive layer 40' and the semiconductor layer 30' are etched by using the first photoresist film pattern 91 as an etch mask. The method of etching the data conductive layer 40' is identical to that of the gate conductive layer. As a result, a data conductive layer pattern 40" is formed. In addition, a preliminary semiconductor layer pattern 30" is formed as the semiconductor layer 30' has been etched. The preliminary semiconductor layer pattern 30" includes a preliminary active pattern 30a" and a preliminary ohmic contact pattern 30b". The preliminary semiconductor layer pattern 30" and the data conductive layer pattern 40" have the same configuration and are overlapped with each other.

A second photoresist film pattern 92 is formed by uniformly removing the first photoresist film pattern 91 by an amount of the first thickness t1. The second photoresist film pattern 92 has a thickness corresponding to the differential thickness between the second thickness t2 and the first thickness t1, and the data conductive layer pattern 40" covering the first and second gate electrodes 11g and 12g is exposed through the second photoresist film pattern 92.

Referring to FIG. 4D, the data conductive layer pattern 40" is etched by using the second photoresist film pattern 92 as an etch mask. As a result, the first source electrode 41s and the first drain electrode 41d are formed on the first gate electrode 11g and the second source electrode 42s and the second drain electrode 42d are formed on the second gate electrode 12g.

In addition, the preliminary semiconductor layer pattern 30" is etched again to form first and second semiconductor patterns 31 and 32. When the preliminary semiconductor layer pattern 30" is etched again, the first ohmic contact pattern 31b divided into two parts is formed in the first semiconductor pattern 31, and the second ohmic contact pattern 32b divided into two parts is formed in the second semiconductor pattern 32.

In this manner, the first and second thin film transistors T1 and T2 are formed together with the first and second semiconductor patterns 31 and 32. In order to form the first and second thin film transistors T1 and T2, the first and second semiconductor patterns 31 and 32, the first and second source electrodes 41s and 42s, and the first and second drain electrodes 41d and 42d are formed by using the same photo mask. As a result, the process steps and the manufacturing cost for the first and second thin film transistors T1 and T2 can be reduced.

Figure 4E:
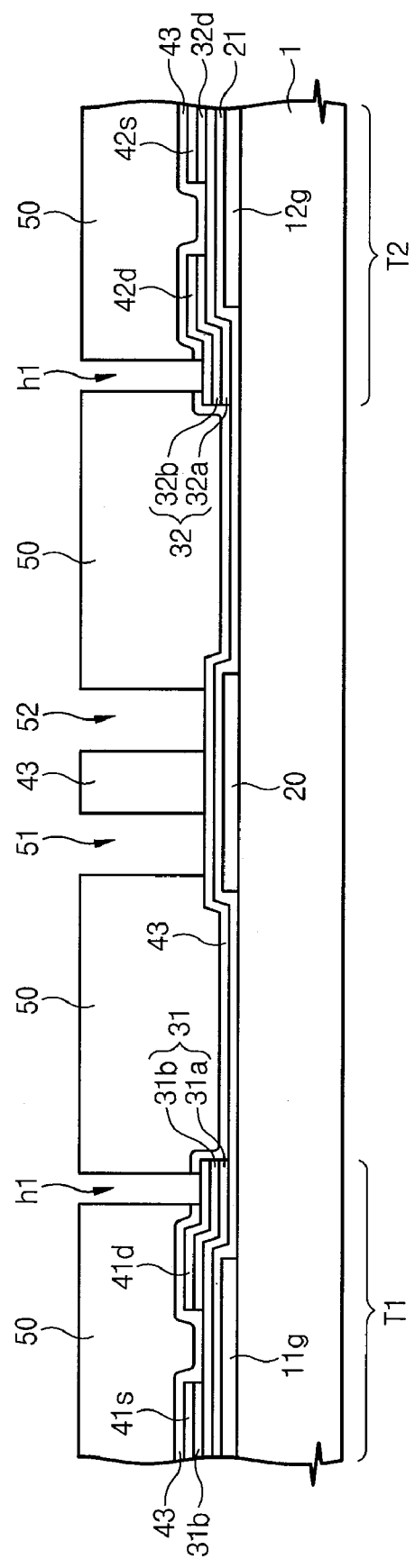

Referring to FIG. 4E, the passivation layer 43 and the insulating layer pattern 50 are formed on the first and second thin film transistors T1 and T2. The passivation layer 43 is formed through a process the same as the process of forming the gate insulating layer 21. The insulating layer pattern 50 can be obtained by coating and patterning acrylic resin.

The passivation layer 43 and the insulating layer pattern 50 are patterned such that first and second contact holes h1 and h2 are formed therein. The insulating layer pattern 50 has first and second openings 51 and 52 at an area corresponding to the storage electrode 20.

The passivation layer 43 and the insulating layer pattern 50 may be formed by using the same photo mask. That is, after coating the passivation layer 43 and the organic layer, photo and development processes are performed. At this time, the insulating layer is completely removed at an area where the first and second contact holes h1 and h2 are formed later such that the passivation layer 43 can be exposed. In addition, the insulating layer is partially removed at an area where the first and second openings 51 and 52 are formed later such that the passivation layer 43 is not exposed. Then, a dry etching process is performed so as to remove the exposed passivation layer 43, thereby forming the first and second contact holes h1 and h2. At the same time, the insulating layer remaining on the storage electrode 20 is removed, thereby forming the first and second openings 51 and 52.

Figure 4F:
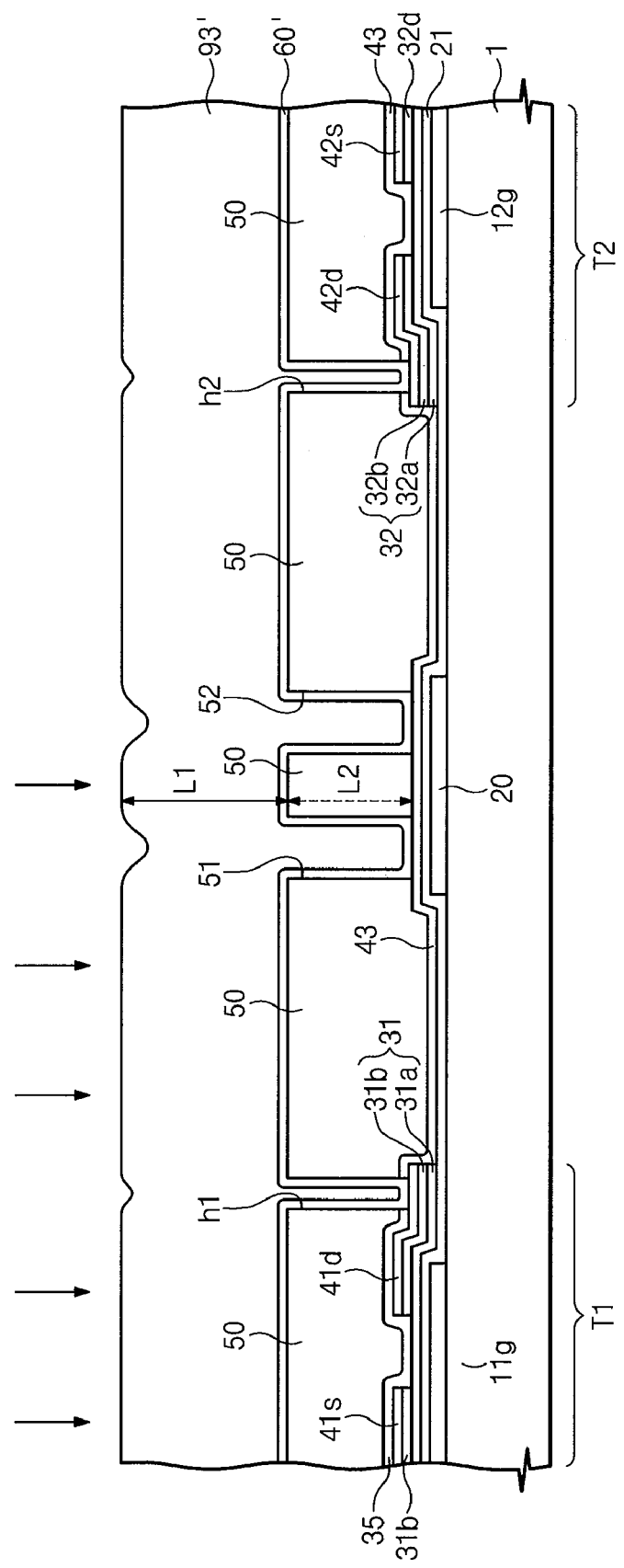

Referring to FIG. 4F, a transparent conductive layer 60' is formed on the insulating layer pattern 50. The transparent conductive layer 60' is formed through a deposition process, such as sputtering. The transparent conductive layer 60' is deposited with a uniform thickness, so the surface height thereof is irregularly formed.

A photoresist film 93' is coated on the transparent conductive layer 60' through a spin coating process. In this case, the photoresist film 93' is uniformly formed regardless of the surface height of the transparent conductive layer 60', so the thickness of the photoresist film 93' is irregularly formed.

Then, the exposure process is performed with regard to the photoresist film 93'. If a positive type photoresist film is used, a predetermined area of the photoresist film 93' that corresponds to a predetermined portion of the transparent conductive layer 60' to be removed is exposed to light. The light that reaches the exposure area of the photoresist film 93' has uniform intensity (see, arrows in FIG. 4F), but the thickness of the photoresist film 93' is irregular. Accordingly, the light may not reach the bottom of the photoresist film 93' in the exposure area of the photoresist film 93' having the greater thickness.

For instance, in the area where the insulating layer pattern 50 is formed on the storage electrode 20, the light path corresponds to "L1". If the insulating layer pattern 50 is opened, the light path may increase to "L1+L2".

Figure 4G:
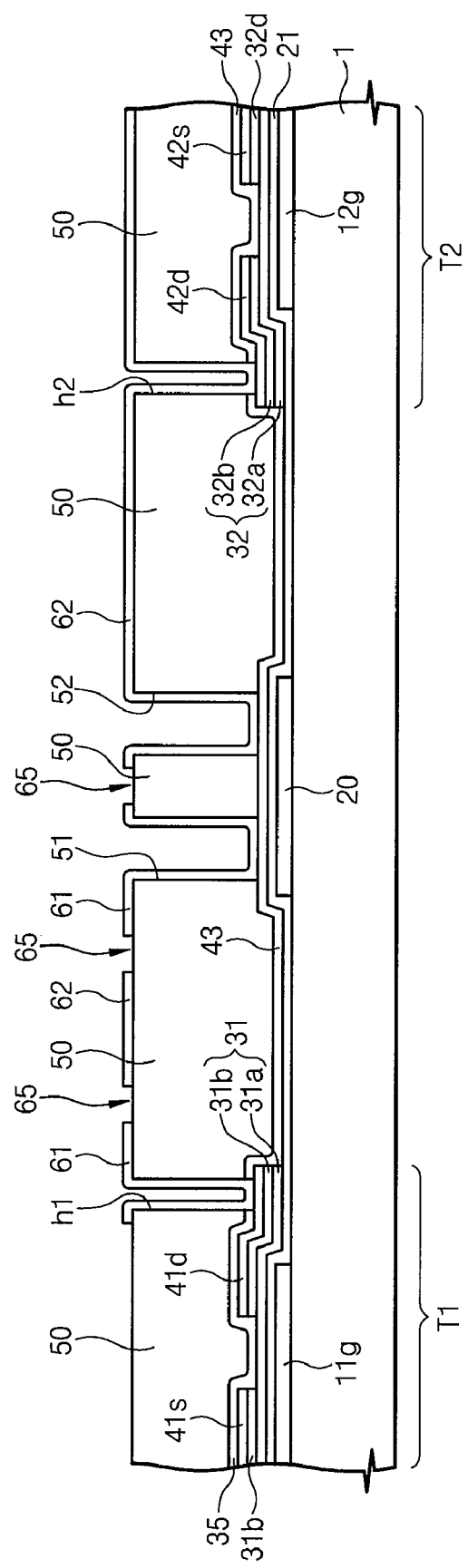

Referring to FIG. 4G, the exposed portion of the photoresist film 93' is removed through a development process, and the transparent conductive layer 60' is etched by using the remaining part as an etch mask, thereby forming the pixel electrodes 60. The pixel electrodes 60 includes first and second pixel electrodes 61 and 62, which are separated from each other on the storage electrode 20.

However, as mentioned above with reference to FIG. 4F, the light does not reach the bottom of the exposed area of the photoresist film 93' if the expose area has the greater thickness, so that some of the photoresist film 93' may remain in the exposed area. In this case, the transparent conductive layer 60' also remains below the photoresist film 93'. If the insulating layer pattern 50 formed on the storage electrode 20 is completely opened, the photoresist film 93' may not be completely exposed to the light in the corresponding area, so that the transparent conductive layer 60' may remain below the photoresist film 93'.

If the transparent conductive layer 60' remains in this manner during the etching process, an electric short may occur between the first and second pixel electrodes 61 and 62. According to the present invention, a predetermined area corresponding to the boundary area between the first and second pixel electrodes 61 and 62 is covered with the insulating layer pattern 50, thereby preventing the electric short from occurring between the first and second pixel electrodes 61 and 62.

Meanwhile, the size of the insulating layer pattern 50 covering the first and second pixel electrodes 61 and 62 may be reduced within a predetermined range that does not cause the electric short. In this case, the capacitance value of the storage capacitor may be increased so that the operational characteristics of the storage capacitor can be improved. For example, the thickness of the insulating layer pattern 50 is slightly reduced, or the insulating layer pattern 50 is smoothly inclined along the first and second openings 51 and 52 at the area where the insulating layer pattern 50 covers the first and second pixel electrodes 61 and 62.

Hereinafter, description will be made in relation to a liquid crystal display device employing the above-mentioned display substrate.

Figure 5:
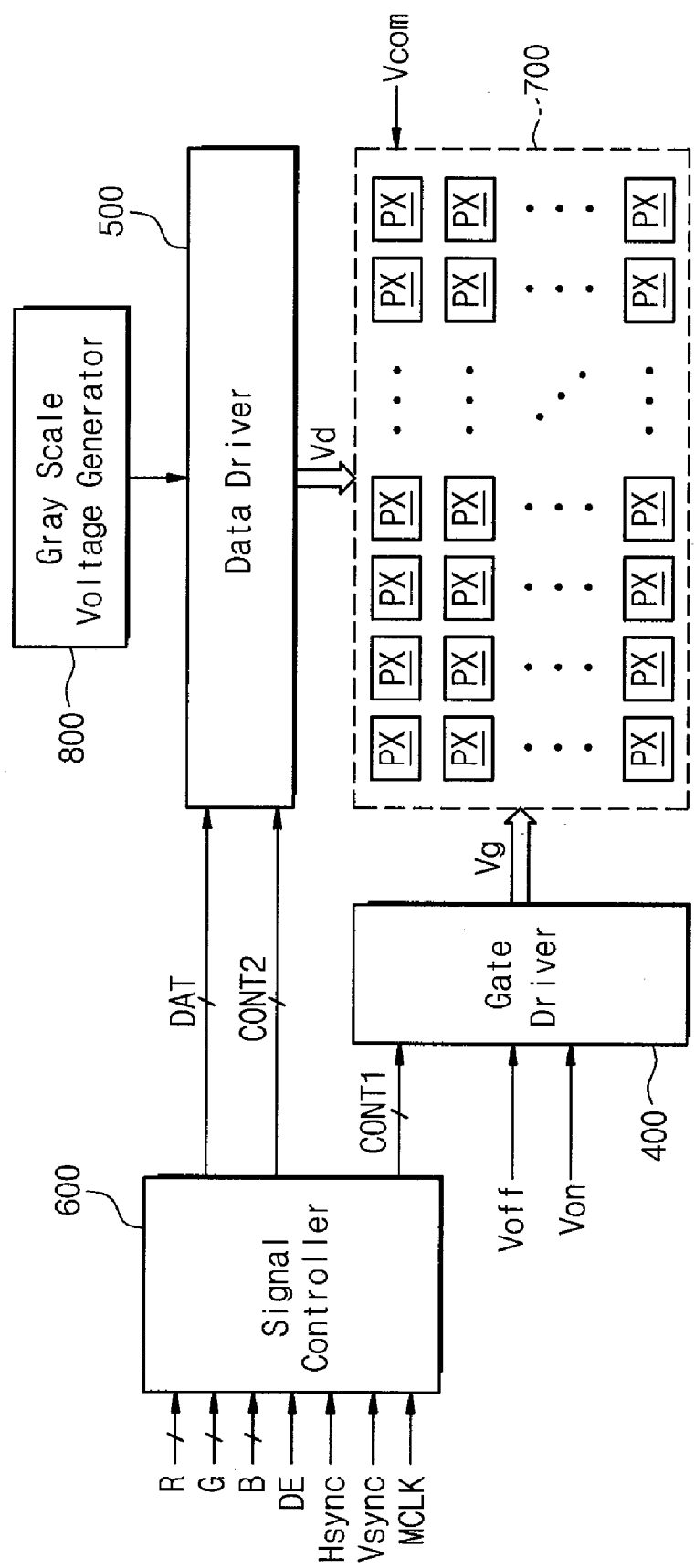
FIG. 5 is a block view of a liquid crystal display device according to an exemplary embodiment of the present invention.
Figure 6:
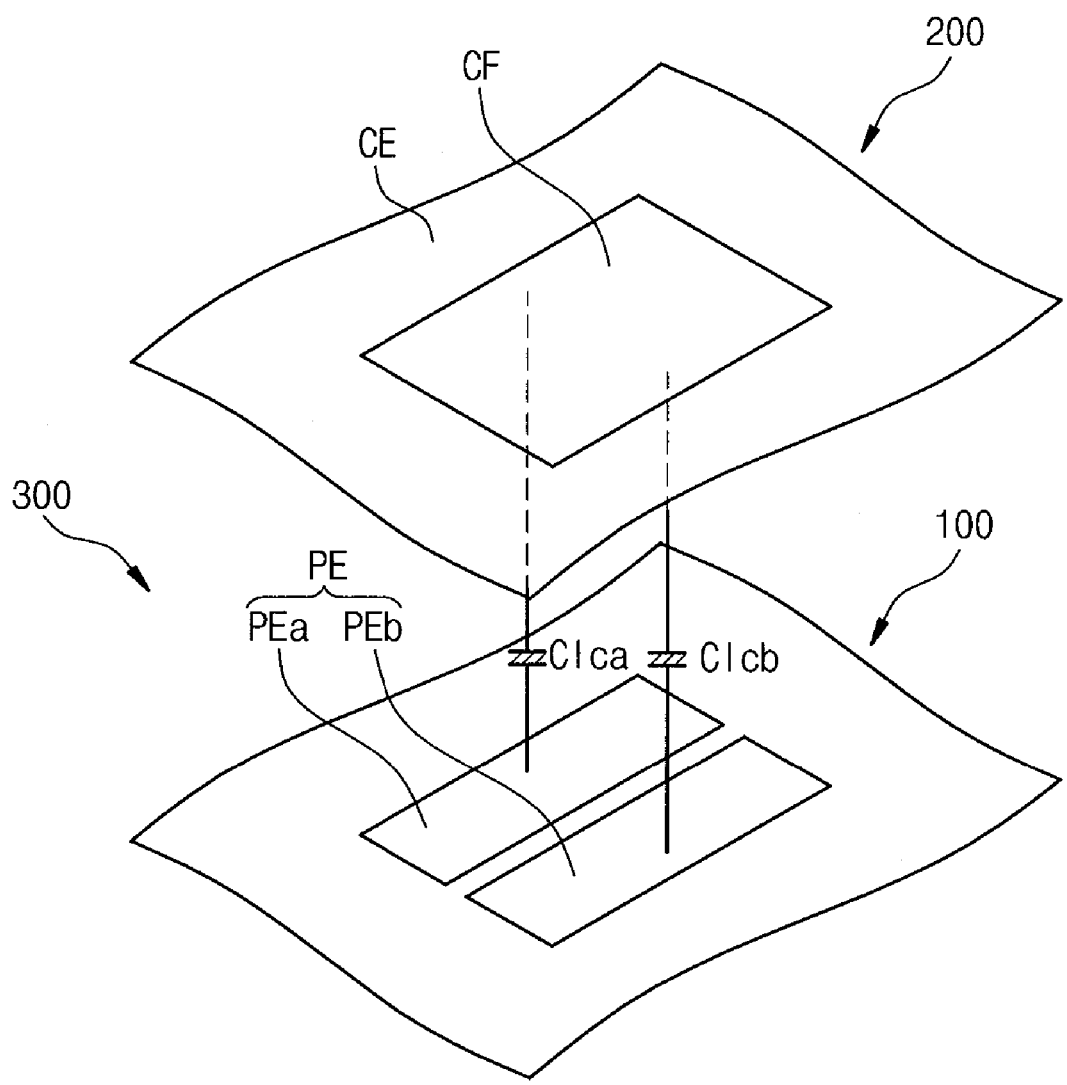
FIG. 6 is a view illustrating an equivalent circuit for two sub-pixels of the liquid crystal display device in FIG. 5.

FIG. 5 is a block view of the liquid crystal display device according to an exemplary embodiment of the present invention, and FIG. 6 is a view illustrating an equivalent circuit for two sub-pixels of the liquid crystal display device in FIG. 5.

As shown in FIG. 5, the liquid crystal display device according to one embodiment of the present invention includes a liquid crystal panel assembly 700, a gate driver 400 connected to the liquid crystal panel assembly 700, a data driver 500 connected to the liquid crystal panel assembly 700, a gray scale voltage generator 800 connected to the data driver 500, and a signal controller 600 that controls the operation of the above elements.

In the equivalent circuit, the liquid crystal panel assembly 700 is connected to a plurality of signal lines (not shown) and includes a plurality of pixels PXs that are aligned in the form of a matrix. In addition, referring to FIG. 6, the liquid crystal panel assembly 700 includes bottom and top display panels 100 and 200 that faces each other and a liquid crystal layer 300 interposed between the bottom and top display panels 100 and 200.

The signal lines include a plurality of gate lines (not shown) transferring gate signals (scan signals) and a plurality of data lines (not shown) transferring data signals. The gate lines extend in the row direction in parallel to each other, and the data lines extend in the column direction in parallel to each other.

Each pixel PX includes a pair of sub-pixels and each sub-pixel includes a liquid crystal capacitor Clca or Clcb. At least one of the sub-pixels includes a switching device (not shown) connected to the gate line, the data line and the liquid crystal capacitor Clca or Clcb.

The liquid crystal capacitor Clca or Clcb adopts a sub-pixel electrode PEa or PEb of the bottom display panel 100 and a common electrode CE of the top display panel 200 as terminals thereof, and the liquid crystal layer 300 interposed between the sub-pixel electrode PEa or PEb and the common electrode CE may serve as a dielectric substance. The sub-pixel electrodes PEa and PEb are separated from each other while forming a pixel electrode PE. The common electrode CE is formed on the entire surface of the top display panel 200 and receives the common voltage Vcom. The liquid crystal layer 300 has a negative anisotropic dielectric constant, and liquid crystal molecules of the liquid crystal layer 300 are aligned such that long-axes thereof are arranged vertically to the surface of the bottom and top display panels 100 and 200 when the electric field is not applied thereto.

Each pixel PX uniquely displays one of primary colors (spatial division) or the pixels PXs alternately display the primary colors according to time (time division), thereby displaying the desired colors. The primary colors include three primary colors of light, such as red, green and blue. FIG. 6 shows an example of the spatial division in which each pixel PX is provided with a color filter CF on a predetermined area of the top display panel 200 in order to represent one of the primary colors. Different from FIG. 6, the color filter CF can be formed above or below of the sub-pixel electrode PEa or PEb of the bottom display panel 100.

Polarizers (not shown) are attached to outer portions of the bottom and top display panels 100 and 200, respectively. Polarizing axes of the polarizers may cross perpendicularly to each other. In the absence of an applied electric field, the light incident into the liquid crystal layer 300 may not be transmitted to the exterior. If a reflective-type liquid crystal display device is used, one of the polarizers can be omitted.

Referring again to FIG. 5, the gray scale voltage generator 800 generates gray scale voltages (or reference gray scale voltages) related to the transmittance of the pixel PX.

The gate driver 400 is connected to the gate line of the liquid crystal panel assembly 700 so as to apply the gate signal Vg, which is a combination of the gate on voltage Von and the gate off voltage Voff, to the gate line.

The data driver 500 is connected to the data line of the liquid crystal panel assembly 700 so as to select the gray scale voltages generated from the gray scale voltage generator 800 and then apply the selected gray scale voltage to the data line as a data signal. However, if the gray scale voltage generator 800 only provides a predetermined number of reference gray scale voltages without providing gray scale voltages for all gray scales, the data driver 500 divides the reference gray scale voltages, thereby creating gray scale voltages for all gray scales and selecting the data signals from among the gray scale voltages.

The signal controller 600 controls the operation of the gate driver 400 and the data driver 500.

Each of the above driving devices 400, 500, 600 and 800 is directly mounted on the liquid crystal panel assembly 700 in the form of an IC chip, or mounted on a flexible printed circuit film (not shown) so as to be attached to the liquid crystal panel assembly 700 in the form of a TCP (tape carrier package). In addition, the above driving devices 400, 500, 600 and 800 can be mounted on a separate printed circuit board (not shown). Furthermore, each of the above driving devices 400, 500, 600 and 800 can be integrated on the liquid crystal panel assembly 700 in the form of a single chip. In this case, at least one of the above driving devices 400, 500, 600 and 800 or at least one of circuit devices constituting the above device devices can be provided outside of the single chip.

Hereinafter, the liquid crystal panel assembly according to one embodiment of the present invention will be described in detail with reference to FIGS. 7 to 13C and FIGS. 5 and 6.

Figure 7:
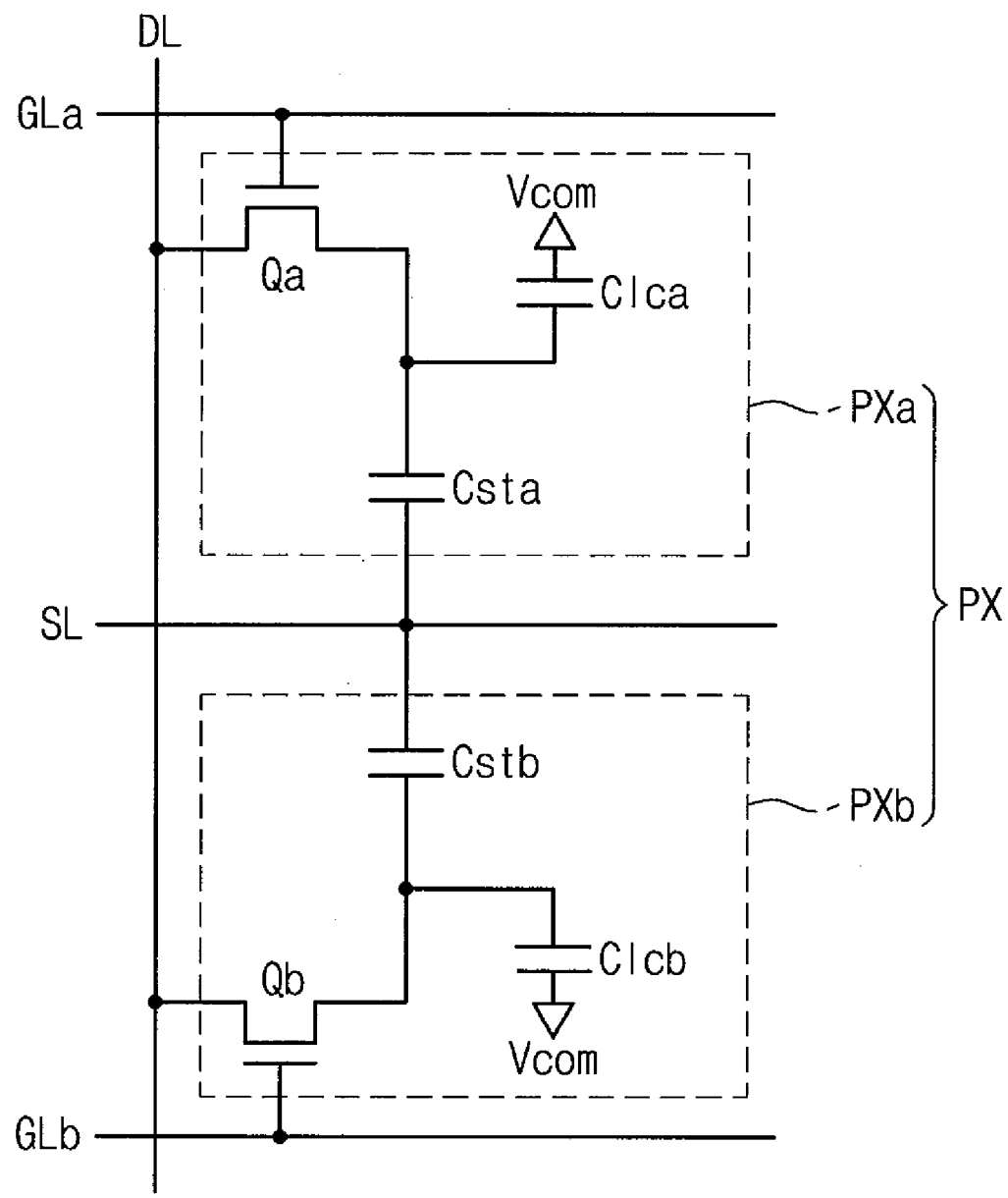
FIG. 7 is a view illustrating an equivalent circuit for one sub-pixel of the liquid crystal display device in FIG. 5.

FIG. 7 is a view illustrating an equivalent circuit for one sub-pixel of the liquid crystal display device in FIG. 5; Referring to FIG. 7, a plurality of pixels PXs are connected to signal lines including a plurality of gate lines GLa and GLb, data lines DLs and storage lines SLs.

Each pixel PX includes a pair of sub-pixels PXa and PXb, and each sub-pixel PXa/PXb includes a switching device Qa/Qb connected to the gate line GLa/GLb and the data line DL, a liquid crystal capacitor Clca/Clcb connected to the switching device Qa/Qb, and a storage capacitor Csta/Cstb connected to the switching device Qa/Qb and the storage line SL.

Each switching device Qa/Qb includes a three-terminal device, such as a thin film transistor provided in the bottom display panel 100, in which a control terminal thereof is connected to the gate line GLa/GLb, an input terminal thereof is connected to the data line DL, and an output terminal thereof is connected to the liquid crystal capacitor Clca/Clcb and the storage capacitor Csta/Cstb.

The storage capacitor Csta/Cstb supporting the liquid crystal capacitor Clca/Clcb can be obtained by overlapping the storage line SL with the pixel electrode PE on the bottom display panel 100 while interposing an insulator therebetween. A predetermined voltage, such as a common voltage Vcom, is applied to the storage line SL. In addition, the storage capacitor Csta/Cstb can be obtained by overlapping the sub-pixel electrode PEa or PEb with a front gate line, which is aligned on the very upper portion of the sub-pixel electrode PEa or PEb, while interposing an insulator therebetween.

The liquid crystal capacitor Clca/Clcb has already been described above, so the detailed description thereof will be omitted below.

According to the liquid crystal display device including the above liquid crystal panel assembly, the signal controller 600 receives input image signals R, G and B for one pixel PX and converts the input image signals R, G and B into an output image signal DAT to transmit the output image signal DAT to the data driver 500. In contrast, the gray scale voltage generator 800 creates gray scale voltage groups for two pixels PXa and PXb so as to alternately provide the gray scale voltage groups to the data driver 500. In this case, the data driver 500 can apply different voltages to the two pixels PXa and PXb by alternately selecting the gray scale voltage groups. At this time, preferably, the image signal is corrected or the gray scale voltage group is created such that the compound gamma curve for the two pixels PXa and PXb approximates to the reference gamma curve at the front of the liquid crystal panel assembly. For instance, the compound gamma curve matches with the reference gamma curve, which is preliminarily established suitable for the liquid crystal panel assembly, at the front of the liquid crystal panel assembly. In addition, the compound gamma curve at the lateral side of the liquid crystal panel assembly approximates to the reference gamma curve at the front of the liquid crystal panel assembly.

Hereinafter, an example of the liquid crystal display device shown in FIG. 7 will be described in detail with reference to FIGS. 7 to 11.

Figure 8:
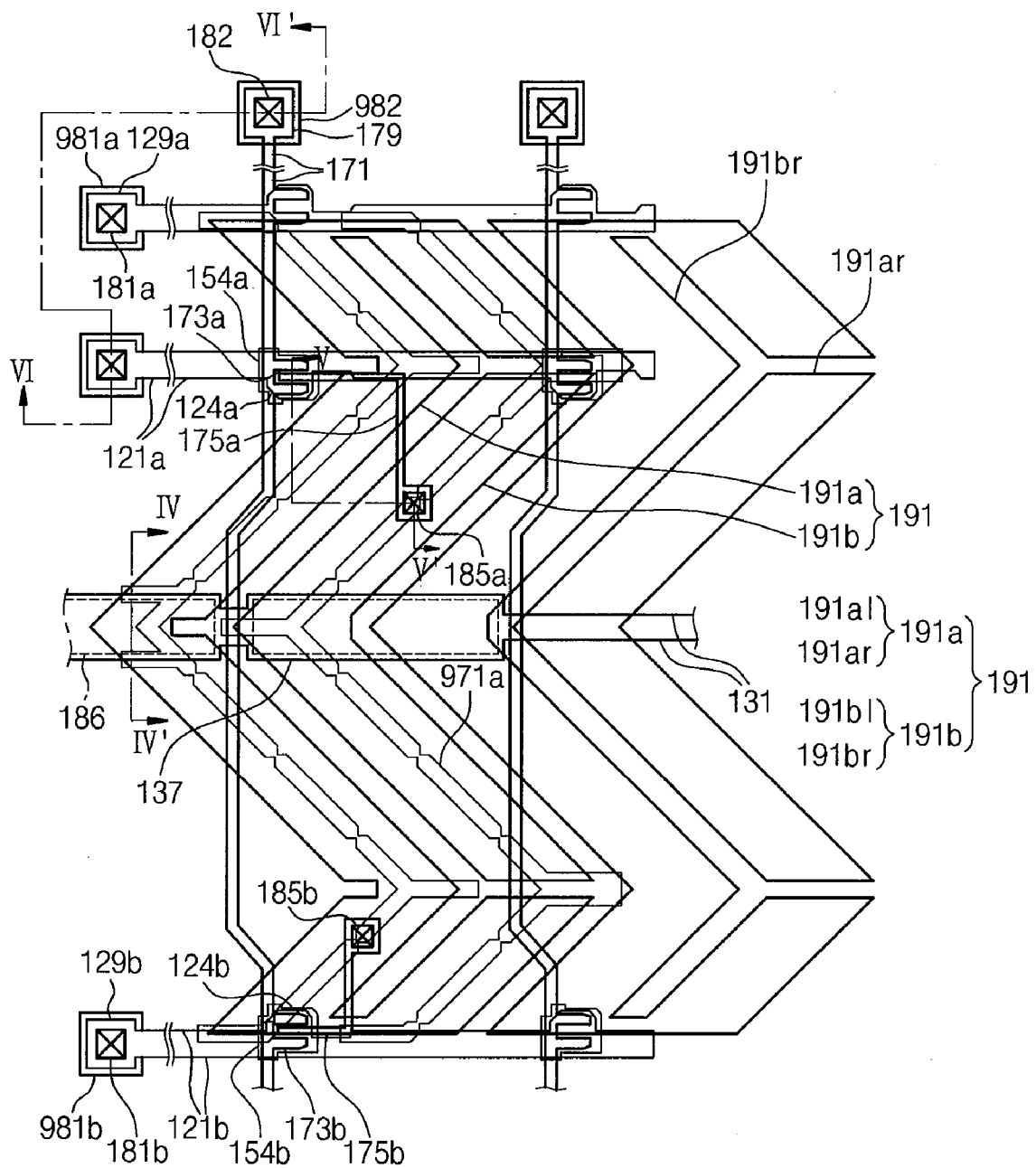
FIG. 8 is a layout view of the liquid crystal display device in FIG. 5.

FIG. 8 is a layout view of the liquid crystal device in FIG. 5, and FIGS. 9, 10 and 11 are sectional views taken along lines IV-IV', V-V' and VI-VI' of the liquid crystal display device in FIG. 8, respectively.

Referring to FIGS. 8 to 11, the liquid crystal panel assembly according to the present invention includes a bottom display panel 100, a top display panel 200 facing the bottom display panel 100 and a liquid crystal layer 300 interposed between the bottom and top display panels 100 and 200.

First, the description will be made relative to the bottom display panel 100.

A plurality of gate conductors including plural pairs of gate lines 121a and 121b and a plurality of storage electrode lines 131 are formed on an insulating substrate 110 including transparent glass or plastic.

The first and second gate lines 121a and 121b transfer gate signals and mainly extend in the transverse direction while being positioned upper and lower portions of the insulating substrate 110.

The first gate line 121a includes a plurality of first gate electrodes 124a protruding upward and a wide end portion 129a that makes connection with other layers or the gate driver 400. The second gate line 121b includes a plurality of second gate electrodes 124b protruding upward and a wide end portion 129b that makes connection with other layers or the gate driver 400. If the gate driver 400 is directly integrated on the substrate 110, the first and second gate lines 121a and 121b may directly connect with the gate driver 400.

The storage electrode lines 131 receive a predetermined voltage, such as a common voltage Vcom, and mainly extend in the transverse direction. The storage electrode lines 131 are interposed between the first and second gate lines 121a and 121b. Each storage electrode line 131 includes a plurality of storage electrodes 137, which are vertically expanded. However, the shape and the alignment of the storage electrode 137 and the storage electrode line 131 can be variously modified.

The gate conductors 121a, 121b and 131 include aluminum-based metals, such aluminum (Al) and an aluminum alloy, silver-based metals, such as silver (Ag) and a silver alloy, copper-based metals, such as copper (Cu) and a copper alloy, molybdenum-based metals, such as molybdenum (Mo) and a molybdenum alloy, chrome (Cr), tantalum (Ta), or titanium (Ti). In addition, the gate conductors 121a, 121b and 131 may have a multi-layer structure including two conductive layers (not shown) having different physical properties. In this case, one of the gate conductors 121a, 121b and 131 is made from metals having low resistivity so as to reduce the signal delay or the voltage drop. For instance, the metals include aluminum-based metals, silver-based metals, or copper-based metals. In contrast, the other gate conductors are made from materials representing superior physical, chemical and electrical contact characteristics relative to indium zinc oxide and indium tin oxide. For instance, the materials include molybdenum-based metals, chrome (Cr), tantalum (Ta), or titanium (Ti). Preferably, a combination of a chrome lower layer and an aluminum (aluminum alloy) upper layer, or a combination of an aluminum (aluminum alloy) lower layer and a molybdenum (molybdenum alloy) upper layer can be employed. Besides above, the gate conductors 121a, 121b and 131 can be formed by using various metals or conductive materials.

Lateral sides of the gate conductors 121a, 121b and 131 are inclined relative to the surface of the substrate 110. Preferably, the inclination angle is in a range of about 30° to about 80°.

The gate insulating layer 140 including SiNx or SiOx is formed on the gate conductors 121a, 121b and 131.

A plurality of first and second island type semiconductors 154a and 154b including hydrogenated amorphous silicon (hereinafter, referred to as amorphous silicon or a-Si) or polysilicon are formed on the gate insulating layer 140. The first and second island type semiconductors 154a and 154b are aligned on the first and second gate electrodes 124a and 124b, respectively.

Island type ohmic contacts 163a and 165a are formed on the first and second island type semiconductors 154a and 154b. The island type ohmic contacts 163a and 165a can be formed by using n+ hydrogenated amorphous silicon doped with high-density n-type impurities, such as phosphorous, or silicide. Pairs of the island type ohmic contacts 163a and 165a are formed on the first and second island type semiconductors 154a and 154b.

Lateral sides of the island type semiconductors 154a and 154b and ohmic contacts 163a and 165a are inclined relative to the surface of the substrate 110. Preferably, the inclination angle is in a range of about 30° to about 80.

A data conductor including a plurality of data lines 171 and plural pairs of first and second drain electrodes 175a and 175b is formed on the island type ohmic contacts 163a and 165a and the gate-insulating layer 140.

The data lines 171 transfer data signals and mainly extend in the longitudinal direction while crossing the gate lines 121a and 121b and the storage electrode line 131. Each data line 171 may not linearly extend on the same line, but is tilted at least two times.

Each data line 171 includes plural pairs of first and second source electrodes 173a and 173b extending toward the first and second gate electrodes 124a and 124b and a wide end portion 179 that makes connection with other layers or the data driver 500. If the data driver 500 is directly integrated on the substrate 110, the data lines 171 may directly connect with the data driver 500.

The first and second drain electrodes 175a and 175b are separated from each other while being separated from the data lines 171.

The first/second drain electrode 175a/175b faces the first/second source electrode 173a/173b on the first/second gate electrode 124a/124b, and a bar-shaped end portion thereof is partially surrounded by the tilted first and second source electrodes 173a and 173b.

The first/second gate electrode 124a/124b, the first/second source electrode 173a/173b, and the first/second drain electrode 175a/175b constitute the first/second thin film transistor Qa/Qb together with the first and second semiconductor 154a/154b. A channel of the first/second thin film transistor Qa/Qb is formed in the first and second semiconductor 154a/154b between the first/second source electrode 173a/173b and the first/second drain electrode 175a/175b.

Preferably, the data conductors 171, 175a and 175b include refractory metals, such as molybdenum, chrome, tantalum and titanium, or an alloy thereof. In addition, the data conductors 171, 175a and 175b may have a multi-layer structure including a refractory metal layer (not shown) and a low-resistance conductive layer (not shown). For instance, the data conductors may have a triple-layer structure consisting of a lower layer including chrome or molybdenum (alloy), an intermediate layer including aluminum (alloy), and an upper layer including molybdenum (alloy). Besides above, the data conductors 171, 175a and 175b can be formed by using various metals or conductive materials.

Lateral sides of the data conductors 171, 175a and 175b are inclined relative to the surface of the substrate 110. Preferably, the inclination angle is in a range of about 30° to about 80°.

The ohmic contacts 163a and 165a may remain between the semiconductors 154a and 154b and data conductors 171, 175a and 175b so as to reduce contact resistance therebetween. The semiconductors 154a and 154b have exposed portions that are not covered with the data conductors 171, 175a and 175b. For example, the semiconductor 154a has the exposed portion between the source electrode 173a and the drain electrode 175a.

A passivation layer 180 including a insulating layer pattern is formed on the data conductors 171, 175a and 175b and the exposed portions of the semiconductors 154a and 154b. The passivation layer 180 is made from inorganic insulating materials or organic insulating materials. The surface of the passivation layer 180 is planarized. Preferably, the organic material has a dielectric constant of 4.0 or less and may have photosensitivity. The passivation layer 180 may have a dual-layer structure including a lower inorganic layer and an upper organic layer in order that the passivation layer 180 can represent superior insulating characteristics of the organic layer without exerting bad influence upon the exposed portions of the semiconductors 154a and 154b.

The passivation layer 180 is formed with a plurality of contact holes 182, 185a and 185b through which the end portion 179 of the data line 171 and one portion of the first and second drain electrodes 175a and 175b are exposed. In addition, a plurality of contact holes 181a and 181b are formed in the passivation layer 180 and the gate-insulating layer 140 so as to expose the end portions 129a and 129b of the gate lines 121a and 121b. In addition, an opening 186 is formed in the passivation layer 180 corresponding to the storage electrode 137.

A plurality of pixel electrodes 191 and contact assistants 981a, 981b and 982 are formed on the passivation layer 180. The pixel electrodes 191 and contact assistants 981a, 981b and 982 may include transparent conductive materials, or reflective metals, such as aluminum, silver, chrome or an alloy thereof.

Each pixel electrode 191 includes a pair of first and second sub-pixel electrodes 191a and 191b, which are separated from each other.

The first sub-pixel electrode 191a is connected to the first drain electrode 175a through the contact hole 185a, and the second sub-pixel electrode 191b is connected to the second drain electrode 175b through the second drain electrode 175b.

The pixel electrode 191 is overlapped with the data line 171 while interposing the passivation layer 180 therebetween. The data lines 171 are overlapped with all adjacent pixel electrodes 191.

Hereinafter, the structure of the pixel electrode of the liquid crystal panel assembly will be described in detail with reference to FIGS. 12 and 13A to 13C.

Figure 12:
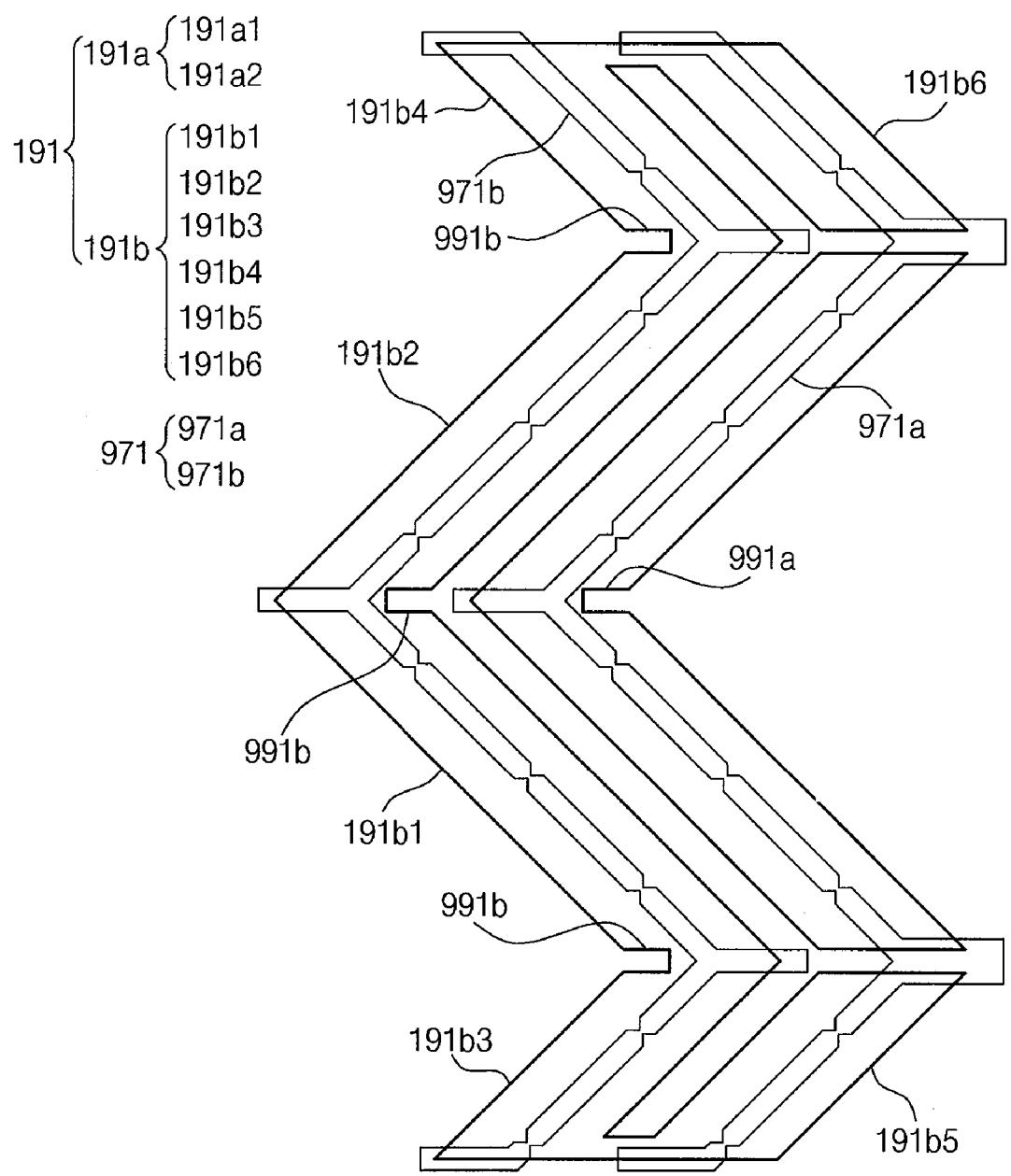
FIG. 12 is a layout view of a pixel electrode and a common electrode of the liquid crystal display device in FIG. 8.

FIG. 12 is a layout view of the pixel electrode and the common electrode of the liquid crystal display device in FIG. 8, and FIGS. 13A to 13C are plan views of an electrode member constituting a sub-pixel electrode in FIG. 12.

As shown in FIG. 12, each pixel electrode 191 of the liquid crystal panel assembly according to the present invention includes a pair of first and second sub-pixel electrodes 191b and 191b, which are separated from each other. The first sub-pixel electrode 191b is adjacent to second sub-pixel electrode 191b in the row direction. Cutout sections 991a and 991b are formed in the first and second sub-pixel electrodes 191a and 191b, respectively. The common electrode 270 (see, FIG. 6) has cutout sections 971a and 971b that face the first and second sub-pixel electrodes 191a and 191b, respectively.

Figure 13A:
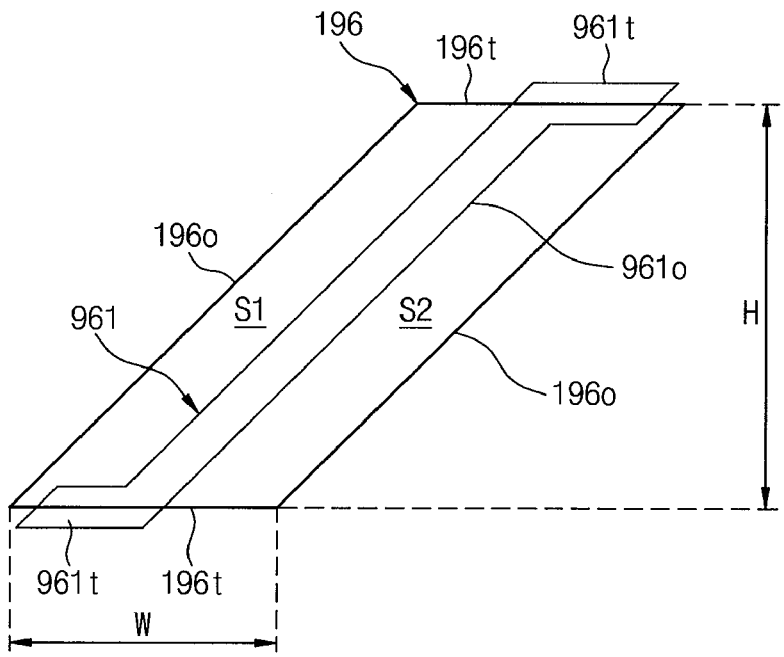
FIGS. 13A to 13C are plan views of an electrode member constituting a sub-pixel electrode shown in FIG. 12.
Figure 13B:
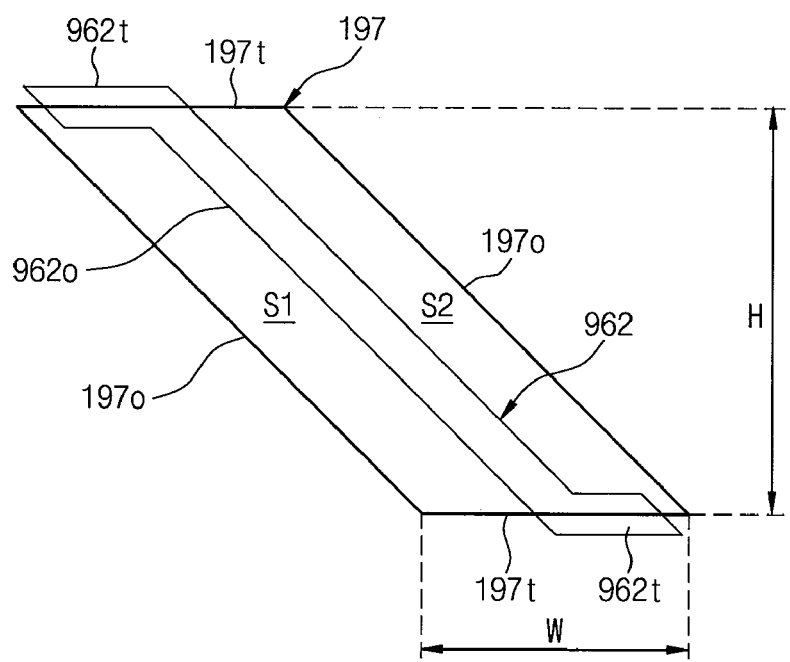
Figure 13C:
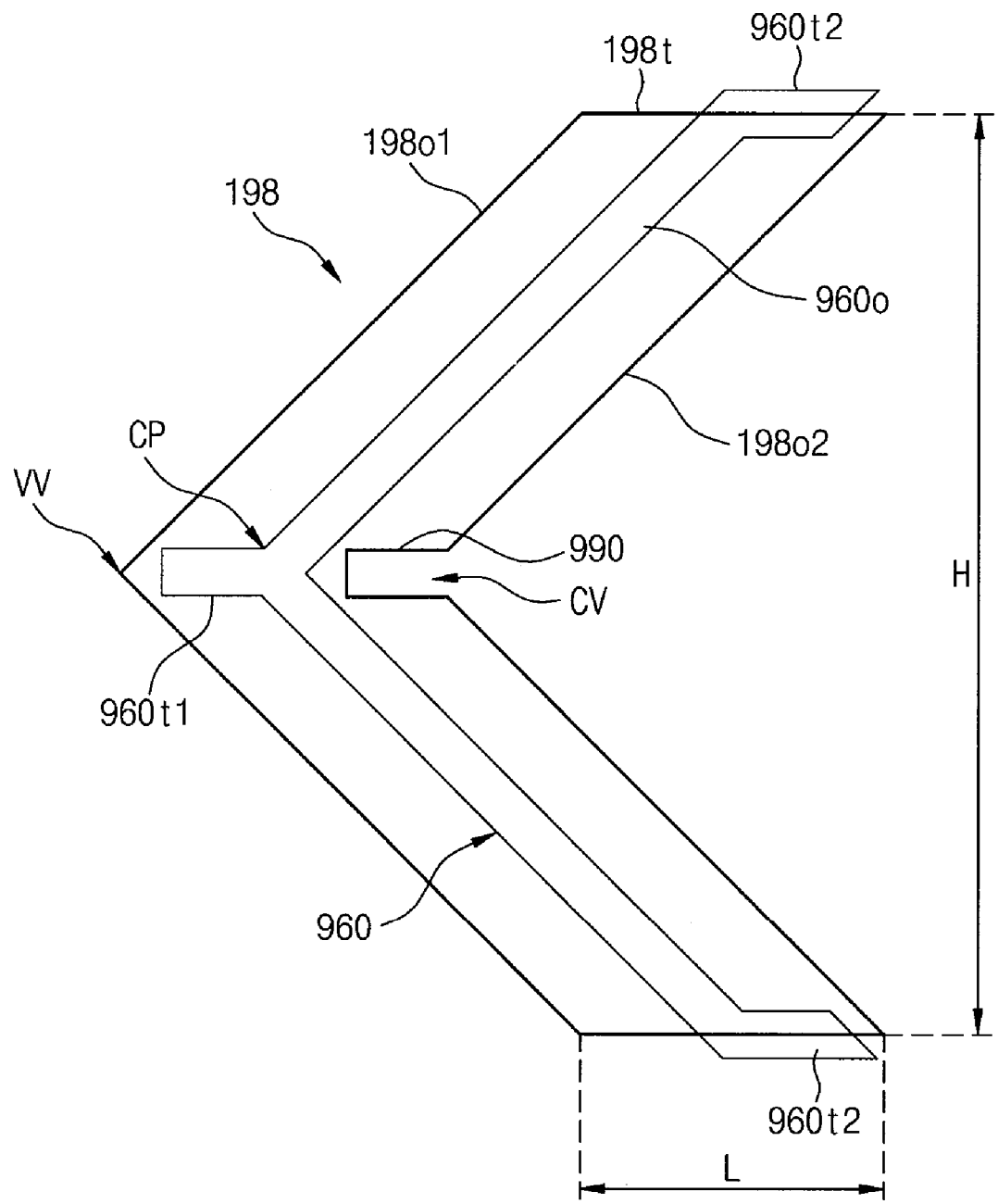

Each of the first and second sub-pixel electrodes 191b and 191b includes at least one parallelogram-shaped electrode member 196 as shown in FIG. 13A, and at least one parallelogram-shaped electrode member 197 as shown in FIG. 13B. A basic electrode 198 as shown in FIG. 13C is obtained by vertically connecting the parallelogram-shaped electrode members 196 and 197 shown in FIGS. 13A and 13b. The sub-pixel electrodes 191a and 191b have the structure based on the basic electrode 198.

As shown in FIGS. 13A and 13B, each electrode member 196 or 197 has a pair of oblique edges 196o and 197o and a pair of transverse edges 196t and 197t so that the electrode member 196 or 197 has a parallelogram shape. Each oblique edge forms an oblique angle relative to the transverse edges 196t and 197t. Preferably, the oblique angle is in a range of 45° to 135°. For convenience, the term "inclination direction" will be adopted on the basis of a perpendicular line extending from the transverse edges 196t and 197t. That is, the electrode member 196 shown in FIG. 13A is inclined in the right inclination direction and the electrode member 197 shown in FIG. 13B is inclined in the left inclination direction.

The transverse length of the transverse edges 196t and 197t, that is, the width of the electrode members 196 and 197, and the longitudinal length between the transverse edges 196t and 197t, that is, the height of the electrode members 196 and 197 can be variously determined according to the size of the liquid crystal panel assembly 700. In addition, the transverse edges 196t and 197t of the electrode members 196 and 197 can be modified by taking relationship relative to other parts into consideration. That is, the transverse edges 196t and 197t can be bent or protruded and these modified shapes are also referred to as the parallelogram shape.

Cutout sections 961 and 962 that face the electrode members 196 and 197 are formed in the common electrode 270. The electrode members 196 and 197 are divided into two sub-regions S1 and S2 with regard to the cutout sections 961 and 962. The cutout sections 961 and 962 are provided with at least one notch. The cutout sections 961 and 962 include oblique sections 961o and 962o, which are parallel to the oblique edges 196o and 197o of the electrode members 196 and 197, and transverse sections 961t and 962t which are overlapped with the transverse edges 196t and 197t of the electrode members 196 and 197 while forming an obtuse angle relative to the oblique sections 961o and 962o.

Each sub-region S1 or S2 has two primary edges, which are defined by the oblique sections 961o and 962o of the cutout sections 961 and 962 and the 196t and 197t of the electrode members 196 and 197. Preferably, the length of the primary edge, that is, the width of the sub-region is about 25 µm to about 40 µm.

The basic electrode 198 shown in FIG. 13C can be obtained by combining the right-inclined electrode member 196 and the left-inclined electrode member 197. An angle formed between the right-inclined electrode member 196 and the left-inclined electrode member 197 is substantially 90°. In addition, a portion of the electrode member 196 is connected to a portion of the electrode member 197, so that a cutout section 990 is formed therebetween. However, the cutout section 990 can be omitted.

Outer transverse edges 196t and 197t of the two electrode members 196 and 197 constitute a transverse edge 198t of the basic electrode 198, and the oblique edges 196o and 197o of the two electrode members 196 are connected to each other, thereby forming curved edges 198o1 and 198o2 of the basic electrode 198.

The curved edges 198o1 and 198o2 include a convex edge 198o1, which meets the transverse edge 198t of the basic electrode 198 while forming an obtuse angle (for example, about 135°) relative to the transverse edge 198t of the basic electrode 198, and a concave edge 198o2, which meets the transverse edge 198t of the basic electrode 198 while forming an acute angle (for example, about 45°) relative to the transverse edge 198t of the basic electrode 198. Since the curved edges 198o1 and 198o2 are defined by the pair of oblique edges 196o and 197o, which are bent at a substantially right angle, the bending angle between the curved edges 198o1 and 198o2 approximates to the right angle.

The cutout section 960 reaches the center of the basic electrode 198 while extending from the concave vertex CV of the concave edge 198o2 toward the convex vertex VV of the convex edge 198o2.

In addition, the cutout sections 961 and 962 of the common electrode 270 are connected to each other, thereby forming the cutout section 960. The transverse sections 961t and 962t of the cutout sections 961 and 962 overlap each other, thereby forming one transverse section 960t1. Such a cutout section 960 will described below in more detail.

The cutout section 960 includes a curved section 960o having a curved point CP, a central transverse section 960t1 connected to the curved point CP of the curved section 960o, and a pair of terminal transverse sections 960t2 formed at both end portions of the curved section 960o. The curved section 960o of the cutout section 960 consists of a pair of oblique sections that are bent at a right angle. The curved section 960o is substantially parallel to the curved edges 198o1 and 198o2 of the basic electrode 198 and divides the basic electrode 198 into a left-half portion and a right-half portion. The central transverse section 960t1 of the cutout section 960 extends toward the convex vertex VV of the basic electrode 198 while forming an obtuse angle (for example, about 135°) relative to the curved section 960o. The terminal transverse sections 960t2 are aligned with the transverse edge 198t of the basic electrode 198 and form an obtuse angle (for example, about 135°) relative to the curved section 960o.

The basic electrode 198 and the cutout section 960 are inversely symmetrical to each other about a virtual line extending from the convex vertex VV to the concave vertex CV of the basic electrode 198 (hereinafter, the virtual linear line will be referred to as a transverse central line).

In the pixel electrode 191 shown in FIG. 12, the size of the first sub-pixel electrode 191a is smaller than the size of the second sub-pixel electrode 191b. In particular, the height of the second sub-pixel electrode 191b is greater than the height of the first sub-pixel electrode 191a, and the first and second sub-pixel electrodes 191a and 191b have the substantially same width. The number of the electrode members in the second sub-pixel electrode 191b is greater than the number of the electrode members in the first sub-pixel electrode 191a.

The first sub-pixel electrode 191a includes the left-inclined electrode member 197 and the right-inclined electrode member 196 and has the structure identical to that of the basic electrode 198 shown in FIG. 13C.

The second sub-pixel electrode 191b includes at least two left-inclined electrode members 197 and at least two right-inclined electrode members 196 that are connected to the basic electrode 198 shown in FIG. 13C.

The second sub-pixel electrode 191b shown in FIG. 12 includes six electrode members 191b1 to 191b6. From among the six electrode members 191b1 to 191b6, two electrode members 191b5 and 191b6 are aligned at upper and lower portions of the first sub-pixel electrode 191a. The second sub-pixel electrode 191b has a triple structure having three branches. This structure advantageously represents longitudinal lines as compared with a structure that has but a single branch. In addition, the transverse sections 961t and 962t of the cutout sections 961 and 962 of the common electrode 270 overlap at a region where the electrode members 191a1 and 191a2 of the first sub-pixel electrode 191a are adjacent to the electrode members 191b5 and 191b6 of the second sub-pixel electrode 191b, thereby forming one transverse section. Thus, the aperture ratio further increases.

The height of the intermediate electrode members 191a1, 191a2, 119b1 and 191b2 is different from the height of the electrode members 191b3 to 191b6 aligned at upper and lower portions of the intermediate electrode members 191a1, 191a2, 191b1 and 191b2. For instance, the height of the electrode members 191b3 to 191b6 is about ½ the height of the intermediate electrode members 191a1, 191a2, 191b1 and 191b2 so that the area ratio between the first and second sub-pixel electrodes 191a and 191b is approximately in the ratio of 1:2. Thus, the desired area ratio can be obtained by adjusting the height of the upper and lower electrode members 191b3 to 191b6.

The alignment and the orientation direction of the first and second sub-pixel electrodes 191a and 191b shown in FIG. 12 can be changed by moving or rotating the pixel electrode 191 shown in FIG. 12 in the inverse direction.

Referring again to FIGS. 8 to 13C, the first/second sub-pixel electrode 191a/191b and the common electrode 270 of the top display panel 200 constitute the first/second liquid crystal capacitor Clca/Clcb together with the liquid crystal layer 300 interposed between the first/second sub-pixel electrode 191a/191b and the common electrode 270, so that the applied voltage can be maintained even if the thin film transistor Qa/Qb has been turned off.

The first/second sub-pixel electrode 191a/191b overlaps the storage electrode 137 with the gate insulating layer 140 interposed therebetween, thereby forming the first/second storage capacitor Csta/Cstb. The first/second storage capacitor Csta/Cstb reinforces the voltage maintenance function of the first/second liquid crystal capacitor Clca/Clcb. Since the opening 186 is formed in the passivation layer 180, only the gate-insulating layer 140 may remain between the pixel electrode 191 and the storage electrode 137. Thus, the distance between the pixel electrode 191 and the storage electrode line 131 is reduced, thereby improving the voltage maintenance function of the first/second liquid crystal capacitor Clca/Clcb.

Contact assistants 981a, 981b and 981 are connected to the end portions 129a and 129b of the gate lines 121a and 121b and the end portion 179 of the data line 171 through the contact holes 181a, 181b and 182, respectively. The contact assistants 981a, 981b and 981 may reinforce the bonding force between the end portions 129a and 129b of the gate lines 121a and 121b and the external device and between the end portion 179 of the data line 171 and the external device, while protecting the end portions 129a and 129b of the gate lines 121a and 121b and the end portion 179 of the data line 171.

Hereinafter, the vertical structure of the top display panel 200 will be described with reference to FIGS. 9 and 10.

A light blocking member 220 is formed on the insulating substrate 210 including transparent glass or plastic. The light blocking member 220 covers an area corresponding to the boundary of the pixel electrode 191 and an area corresponding to the thin film transistor. In addition, the light blocking member prevents light leakage occurring between the pixel electrodes 191 and is opened in an area that faces the pixel electrode 191.

A plurality of color filters 230 are formed on the substrate 210 and the light blocking member 220. Most color filters 230 exist in a region surrounded by the light blocking member 220 and extend in the column direction of the pixel electrodes 191. Each color filter 230 can represent one of three primary colors including red, green and blue.

An overcoat 250 is formed on the color filters 230 and the light blocking member 220. The overcoat 250 may include an (organic) insulating material. The overcoat 250 prevents the color filters 230 from being exposed and provides a planar surface. The overcoat 250 can be omitted.

The common electrode 270 is formed on the overcoat 250.

The common electrode 270 is formed with a plurality of cutout sections 971a and 971b.

Alignment layers 911 and 921, such as vertical alignment layers, can be formed at inner portions of the display panels 100 and 200.

Polarizers 912 and 922 are provided at outer portions of the bottom and top display panels 100 and 200, respectively. At this time, polarizing axes of the polarizers may cross perpendicularly to each other. One of the polarizing axes of the polarizers is preferably parallel to the gate lines 121a and 121b. In the case of the reflective-type liquid crystal display device, one of the polarizers 912 and 922 can be omitted.

The liquid crystal display device may includes the polarizers 912 and 922, a retardation layer, top and bottom display panels 100 and 200, and a backlight unit (not shown) that provides the light to the liquid crystal layer 300.

The liquid crystal layer 300 has a negative anisotropic dielectric constant, and liquid crystal molecules of the liquid crystal layer 300 are aligned such that long-axes thereof are arranged vertically to the surface of the bottom and top display panels 100 and 200 when the electric field is not applied thereto.

Hereinafter, the operation of the liquid crystal display device having the above structure will be described in detail.

The signal controller 600 receives input image signals R, G and B and input control signals controlling the display of the input image signals R, G and B from an external graphic controller (not shown) and treats the input image signals R, G and B and input control signals according to the operation conditions of the liquid crystal panel assembly 700, thereby creating gate control signals CONT1 and data control signals CONT2 to transmit the gate control signals CONT1 and data control signals CONT2 to the gate driver 400 and the data driver 500, respectively.

The gate driver 400 applies the gate on voltage Von to the gate line according to the gate control signal CONT1 received from the signal controller 600, thereby turning on the switching device connected to the gate line. Thus, the data signal applied to the data line can be applied to the corresponding pixel PX through the switching device.

At this time, since the first and second sub-pixel electrodes 191a and 191b that constitute one pixel electrode 191 are connected to different switching devices, the first and second sub-pixel electrodes 191a and 191b may sequentially receive the different data voltages at a predetermine time interval through the same data line. Alternatively, while the first and second sub-pixel electrodes 191a and 191b are connected to different switching devices, the first and second sub-pixel electrodes 191a and 191b can receive the different data voltages at the same time through different data lines. Or, while the first sub-pixel electrode 191a is connected to the switching device (not shown) and the second sub-pixel electrode 191b is connected to the first sub-pixel electrode 191a through capacitive coupling, only the sub-pixel including the first sub-pixel electrode 191a may receive the data voltage through the switching device, and the sub-pixel including the second sub-pixel electrode 191b has a variable voltage which is changed depending on the voltage of the first sub-pixel electrode 191a. In this case, the voltage of the first sub-pixel electrode 191a having a relatively smaller area is greater than the voltage of the second sub-pixel electrode 191b having a relatively larger area.

The difference between the voltage of the data signal applied to the pixel PX and the common voltage Vcom is represented as the charge voltage of the liquid crystal capacitor, that is, the pixel voltage. The alignment of the liquid crystal molecules may change according to the level of the pixel voltage and the polarizing state of the light passing through the light crystal layer 300 may change according to the alignment state of the liquid crystal molecules. Such variation of the polarizing light is represented as transmittance variation by means of polarizers attached to the liquid crystal panel assembly 700. The pixel PX displays brightness represented by the gray scale of the image signal DAT based on the transmittance variation.

The inclination angle of the liquid crystal molecules may vary depending on the intensity of the electric field applied thereto. Since two liquid crystal capacitors Clca and Clcb have voltages different from each other, the liquid crystal molecules are aligned with different inclination angles, so that the two sub-pixels exhibit different brightness. Therefore, the image viewed from the front of the liquid crystal display device may approximate to the image viewed from the lateral side of the liquid crystal display device if the voltages of the first and second capacitors Clca and Clcb are properly adjusted. That is, the lateral gamma curve may approximate to the front gamma curve. In this manner, lateral visibility of the liquid crystal display device can be improved.

In addition, if the area of the first sub-pixel electrode 191a receiving the higher voltage is designed smaller than the area of the second sub-pixel electrode 191b, the lateral gamma curve may more approximate to the front gamma curve. In particular, if the surface ratio between the first and second sub-pixel electrodes 191a and 191b is from about 1:2 to from about 1:3, the lateral gamma curve further approximates to the front gamma curve, so that lateral visibility of the liquid crystal display device can be further improved.

The inclination direction of the liquid crystal molecules is primarily determined by the horizontal components of the electric field, which are created because the cutout sections 971a and 971b of the pixel and common electrodes 191 and 270 and the lateral sides of the sub-pixel electrodes 191a and 191b distort the primary electric field. The horizontal components of the electric field are substantially perpendicular to the edges of the cutout sections 971a and 971b and the edges of the sub-pixel electrodes 191a and 191b.

Since most liquid crystal molecules aligned on sub-regions divided by the cutout sections 971a and 971b are inclined perpendicularly to the primary edges, the liquid crystal molecules may assumed to be inclined in four directions. In this manner, if the inclination directions of the liquid crystal molecules are diversified, the reference-viewing angle of the liquid crystal display device may be widened.

If protrusions are formed on the common electrode 270, instead of forming the cutout sections 971a and 971b, the protrusions may serve as the cutout sections 971a and 971b. That is, the electric field is distorted by the protrusions, thereby widening the reference-viewing angle of the liquid crystal display device.

The secondary electric field, which is additionally created due to the differential voltage between the sub-pixel electrodes 191a and 191b, is formed perpendicularly to the primary edge of the sub-region. Accordingly, the direction of the secondary electric field matches with the direction of the horizontal components of the primary electric field. As a result, the secondary electric field created between the sub-pixel electrodes 191a and 191b may serve to determine the inclination direction of the liquid crystal molecules.

As described above, the cutout section of the common electrode 270 includes the central transverse section 960t1, the curved section 960o, and the terminal transverse sections 960t2. As shown in FIG. 8, if the central transverse section 960t1 completely overlaps with the storage electrode 137, the central transverse section 960t1 can be divided into a pair of central transverse sections along the brink of the storage electrode 137.

The central transverse section 960t1 is aligned at a specific position where a pair of oblique sections, which are symmetrically aligned to form the curved section 960o, meet each other. In the above specific position, the liquid crystal molecules are affected by the right-inclined portion and the left-inclined portion of the oblique section, so that the alignment direction of the liquid crystal molecules may be scattered. The central transverse section 960t1 prevents the above problem by controlling the alignment direction of the liquid crystal molecules.

Figure 9:
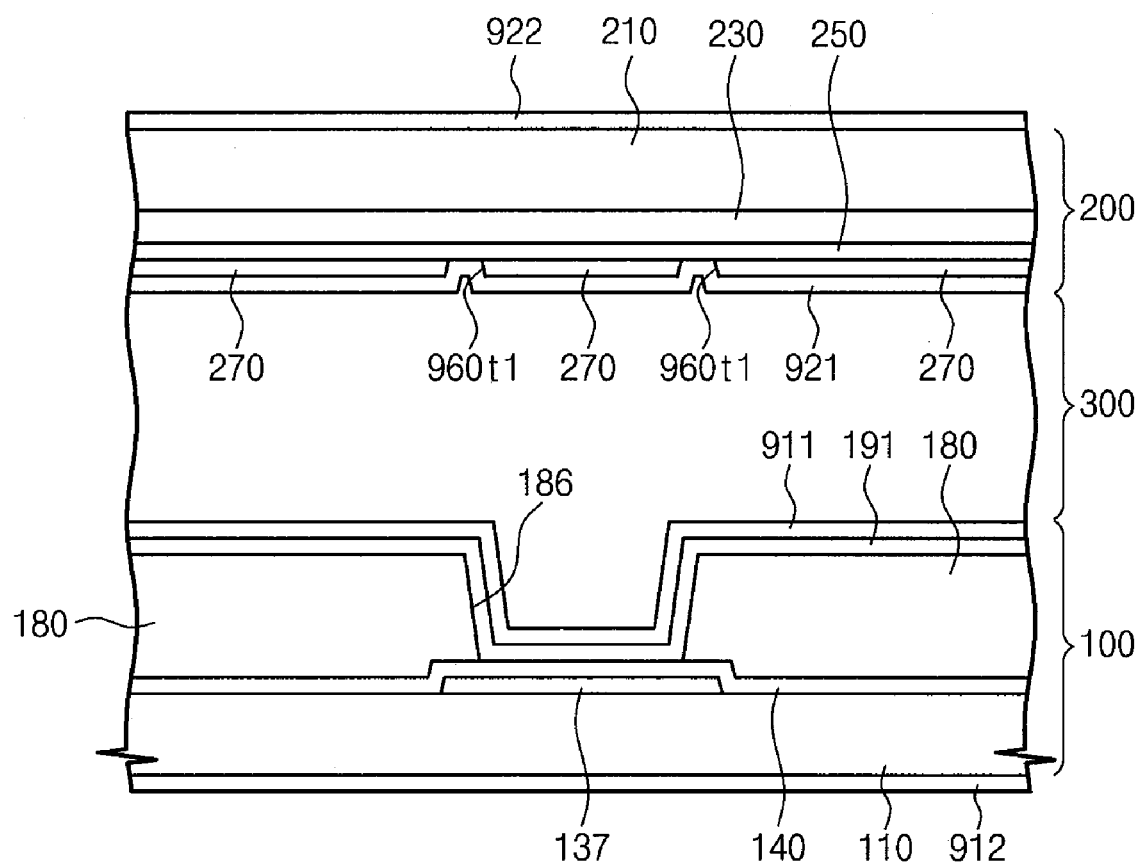
FIGS. 9, 10 and 11 are sectional views taken along lines IV-IV', V-V' and VI-VI' of the liquid crystal display device in FIG. 8, respectively.
Figure 10:
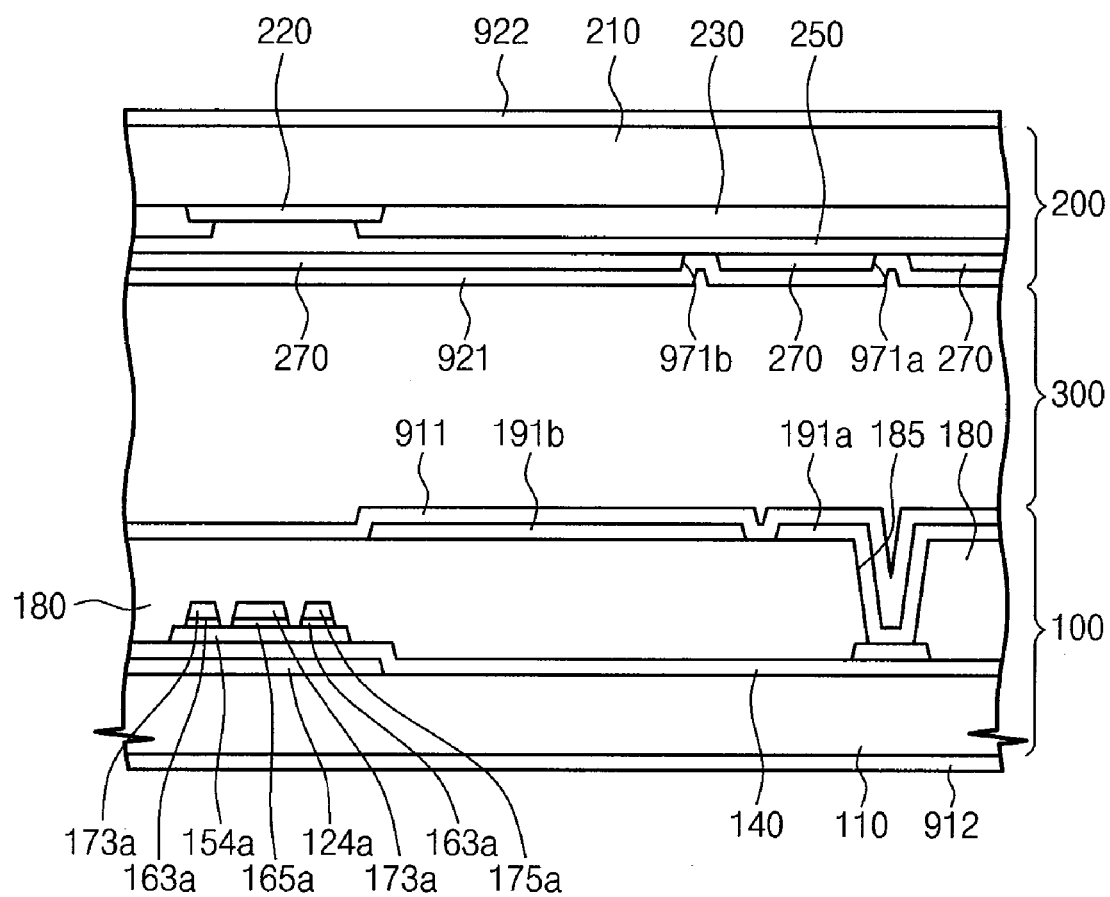
Figure 11:
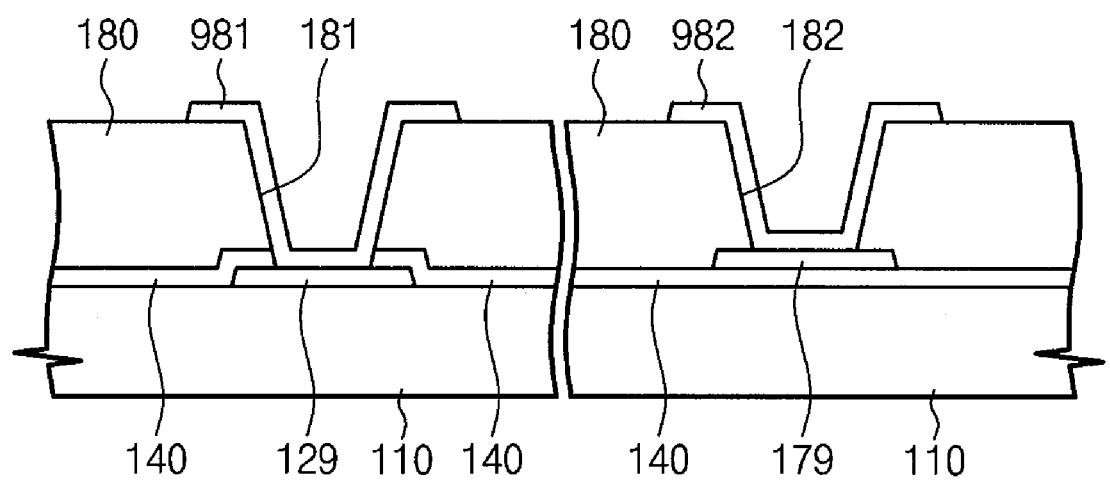

However, as shown in FIG. 9, the distance between the common electrode 270 and the opening 186 may increase in the area where the storage electrode 137 is formed. Accordingly, the liquid crystal molecules may not be precisely controlled by the central transverse section 960t1 in the above area. In order to solve this problem, as shown in FIG. 8, a pair of central transverse sections 960t1 are formed at brink portions of the storage electrode 137 while being overlapped with the area where the storage electrode 137 is formed.

Hereinafter, a liquid crystal panel assembly according to another embodiment of the present invention will be described with reference to FIG. 14.

Figure 14:
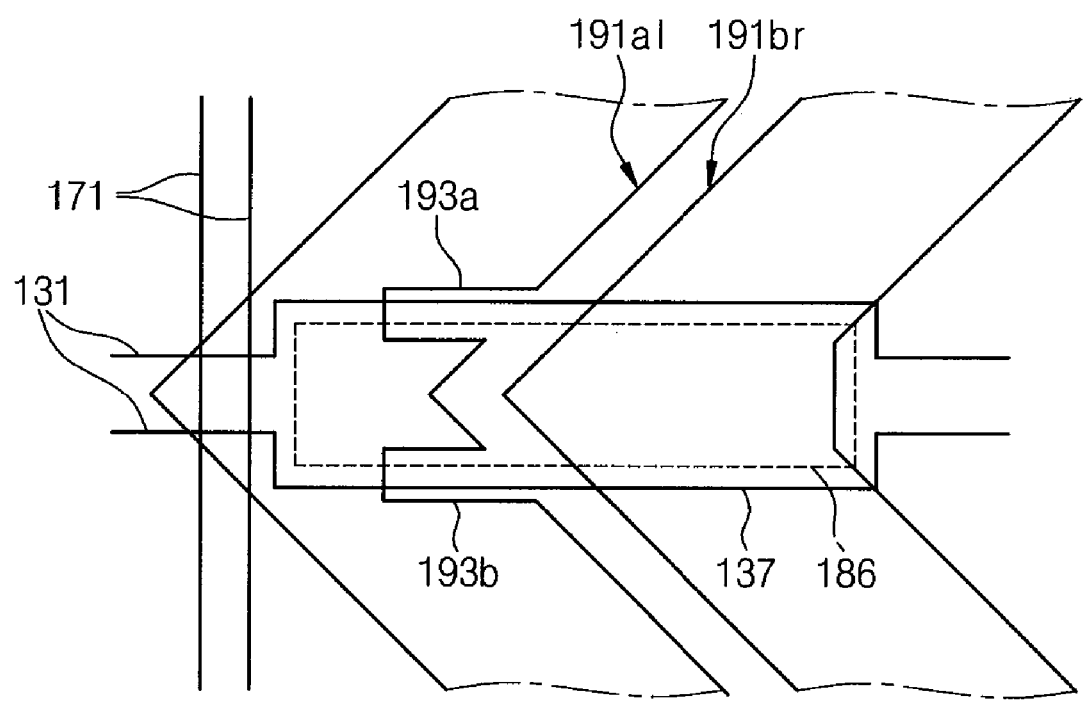
FIG. 14 is a layout view illustrating a part of a liquid crystal display device according to another embodiment of the present invention.

FIG. 14 is a layout view illustrating a part of a liquid crystal display device according to another embodiment of the present invention.

The liquid crystal panel assembly according to another embodiment of the present invention includes bottom and top display panels (not shown) that face each other and a liquid crystal layer (not shown) interposed between the bottom and top display panels.

The vertical structure of the liquid crystal panel assembly is substantially identical to the layer-structure of the liquid crystal panel assembly shown in FIGS. 8 to 13C, so the detailed description for the same elements and functions will be omitted in order to avoid redundancy.

Regarding the bottom display panel, a plurality of gate conductors including a plurality of gate lines (not shown) and storage electrode lines 131 are formed on an insulating substrate (not shown). The storage electrode line 131 includes a storage electrode 137. A gate-insulating layer (not shown) is formed on the gate conductor. An island type semiconductor (not shown) is formed on the gate-insulating layer, and a plurality of ohmic contact members (not shown) are formed on the island type semiconductor. A data conductor including a plurality of data lines 171 is formed on the ohmic contact members and the gate-insulating layer. A passivation layer (not shown) having an opening 186 is formed on the data conductor and the exposed portion of the semiconductor. The passivation layer and the gate-insulating layer are formed with a plurality of contact holes (not shown) and the opening 186. A plurality of pixel electrodes 191 and contact assistants (not shown) are formed on the passivation layer.

Regarding the top display panel, a light blocking member (not shown), a plurality of color filters (not shown), an overcoat (not shown), a common electrode (not shown) and an alignment layer (not shown) are formed on an insulating substrate (not shown).

The pixel electrode 191 is divided into a first sub-pixel 191al having a concave edge and a second sub-pixel 191br having a convex edge. At least one recess 193a/193b is formed on a corner portion of the concave edge. Preferably, two recesses 193a and 193b of the first sub-pixel 191al are formed along the lateral side of the opening 186. Thus, an interval between adjacent first and second sub-pixels 191al and 191br can be sufficiently ensured, thereby preventing the electric short between the first and second sub-pixels 191al and 191br.

The present invention can be embodied if at least one recess 193a/193b is provided, but the present invention is not limited to the shape and number of the recesses. Since the recess 193a/193b can be obtained by cutting a predetermined portion of the pixel electrode 191, the recess 193a/193b has the same function with the central transverse section 960t1 of the common electrode 270 that controls the direction of the liquid crystal molecules. Similar to the central transverse section 960t1, a pair of recesses 193a and 193b are formed at the brink portions of the storage electrode 137 in the area where the recesses 193a and 193b overlap with the storage electrode 137.

Hereinafter, a liquid crystal panel assembly according to still another embodiment of the present invention will be described with reference to FIG. 15.

Figure 15:
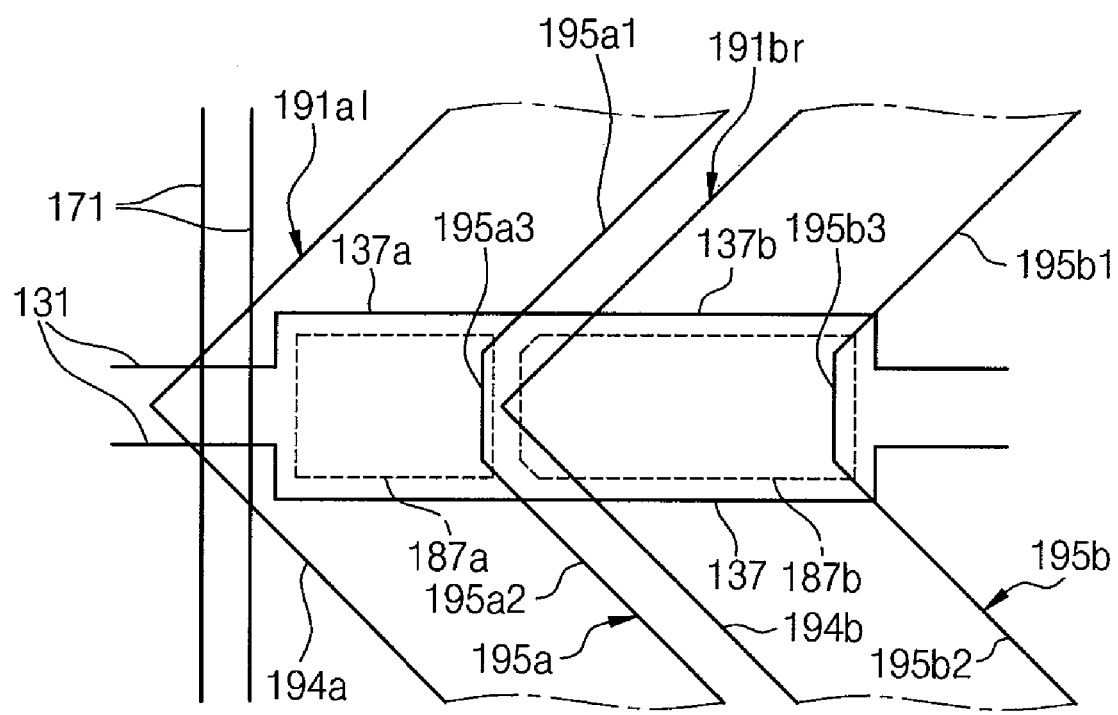
FIG. 15 is a layout view illustrating a part of a liquid crystal display device according to still another embodiment of the present invention.

FIG. 15 is a layout view illustrating a part of a liquid crystal display device according to still another embodiment of the present invention.

The liquid crystal panel assembly according to still another embodiment of the present invention includes bottom and top display panels (not shown) that face each other and a liquid crystal layer (not shown) interposed between the bottom and top display panels.

The vertical structure of the liquid crystal panel assembly is substantially identical to the layer-structure of the liquid crystal panel assembly shown in FIGS. 8 to 13C, so the detailed description for the same elements and functions will be omitted in order to avoid redundancy.

Referring to FIG. 15, a first sub-pixel electrode 191al of the pixel electrode 191, which is aligned at a left side, is adjacent to a second sub-pixel electrode 191br of the pixel electrode 191, which is aligned at a right side, in the row direction. The first and second sub-pixel electrodes 191al and 191br have convex edges 194a and 194b, respectively. In addition, the first and second sub-pixel electrodes 191al and 191br have concave edges 195a and 195b, respectively. The concave edge 195a includes two oblique edges 195a1 and 195a2 and a longitudinal edge 195a3 connecting the two oblique edges 195a1 and 195a2, and the concave edge 195b includes two oblique edges 195b1 and 195b2 and a longitudinal edge 195b3 connecting the two oblique edges 195b1 and 195b2.

A storage electrode line 131 extends by passing through the center portion of a pixel electrode 191. That is, the pixel electrode 191 is symmetrically formed in the longitudinal direction with regard to the storage electrode line 131. One storage electrode 137 extends over two adjacent pixel electrodes 191. In detail, the storage electrode 137 overlaps with the first sub-pixel electrode 191al of the pixel electrode 191, which is aligned at the left side, and the second sub-pixel electrode 191br of the pixel electrode 191, which is aligned at the right side. The storage electrode 137 includes a first section 137a, which overlaps the first sub-pixel electrode 191al of the pixel electrode 191, and a second section 137b, which overlaps the second sub-pixel electrode 191br of the pixel electrode 191.

A passivation layer is formed between the storage electrode 137 and the pixel electrode 191. First and second openings 187a and 187b are formed in the passivation layer. The first section 137a of the storage electrode 137 is exposed through the first opening 187a and the second section 137b of the storage electrode 137 is exposed through the second opening 187b. The first and second openings 187a and 187b are separated from each other at a region where the first and second openings 186a and 187b are overlapped with the first and second sub-pixel electrodes 191al and 191br. Thus, an electric short circuit is prevented from occurring between the first and second sub-pixel electrodes 191al and 191br at a stepped portion of the first and second openings 187a and 187b.

Two vertex points of the second opening 187b adjacent to the convex edge of the second sub-pixel electrode 191br are chamfered. The chamfering surfaces are parallel to the convex edge of the second sub-pixel electrode 191br to prevent reduction in the capacitance of the storage capacitor.

According to the present invention, the display device includes pixel electrodes that are distinguished from each other so the operational characteristics of the display device can be improved. In addition, an electric short circuit is prevented from occurring between the pixel electrodes in the process of forming the pixel electrodes.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display substrate comprising:
a substrate comprising a plurality of pixels each comprising a first area and a second area;
a storage electrode extending over the first and second areas;
an insulating layer pattern covering the substrate and having an opening on the storage electrode; and
first and second pixel electrodes formed on the insulating layer pattern, the first and second pixel electrodes being separated from each other, and positioned on the first and second areas, respectively,
wherein at least one of the first and second pixel electrodes has at least one recess at an area corresponding to an edge of the opening.

2. The display substrate of claim 1, wherein the first and second areas belong to a same pixel area and receive different voltages corresponding to image information.

3. The display substrate of claim 1, wherein the first and second pixel electrodes are oriented relative to a length direction of the storage electrode and oriented symmetrically to each other.

4. The display substrate of claim 3, wherein a pair of recesses are symmetrically positioned at edge portions of the storage electrode while extending in parallel to the length direction of the storage electrode.

5. The display substrate of claim 1, wherein the insulating layer pattern comprises an organic insulating layer.

6. The display substrate of claim 5, wherein the organic insulating layer defines the opening at each pixel area.

7. A display substrate comprising:
a substrate comprising a plurality of pixels each comprising a first area and a second area;
a storage electrode extending over the first and second areas;
an insulating layer pattern covering the substrate, and having a first opening on the storage electrode disposed on the first area and a second opening on the storage electrode disposed on the second area; and
first and second pixel electrodes formed on the insulating layer pattern, the first and second pixel electrodes being separated from each other, and positioned on the first and second areas, respectively,
wherein at least one boundary of the first and second pixel electrodes is disposed on an area between the first opening and the second opening.

8. The display substrate of claim 7, wherein the first and second areas belong to a same pixel area and receive different voltages.

9. The display substrate of claim 7, wherein the first and second pixel electrodes are inclined relative to a length direction of the storage electrode and bent symmetrically to each other.

10. The display substrate of claim 9, wherein at least one vertex of the first and second openings of the insulating layer pattern is chamfered, and the chamfering surface is parallel to one of the first and second pixel electrodes.

11. The display substrate of claim 7, wherein the insulating layer pattern comprises an organic insulating layer.

12. The display substrate of claim 11, wherein the organic insulating layer defines the first and second openings at each pixel area.

13. A liquid crystal display device comprising:
first and second substrates that face each other, the first substrate comprising a plurality of pixels each comprising a first area and a second area;
a liquid crystal layer having liquid crystal and interposed between the first and second substrates;
a storage electrode formed on the first substrate, and extending over the first and second areas;
an insulating layer pattern covering the substrate formed on the storage electrode, and having an opening on the storage electrode;
first and second pixel electrodes formed on the insulating layer pattern, the first and second pixel electrodes being separated from each other, and positioned on the first and second areas, respectively,
and
a common electrode formed on the second substrate and having at least one direction controller that controls an alignment direction of the liquid crystal,
wherein the direction controller has a pair of portions symmetrically positioned at brink portions of the storage electrode while extending in parallel to a lengthwise direction of the storage electrode.

14. The liquid crystal display device of claim 13, wherein the direction controller overlaps the brink portion of the storage electrode when viewed in a plan view.

15. The liquid crystal display device of claim 13, wherein the direction controller includes a cutout pattern obtained by partially removing the common electrode.

16. The liquid crystal display device of claim 13, wherein the direction controller includes a protrusion formed on the common electrode.

17. The liquid crystal display device of claim 13, wherein the first substrate includes first and second areas that are separated from each other, a boundary of the first and second areas being positioned on the storage electrode, and the direction controller is spaced apart from the boundary.

18. The liquid crystal display device of claim 17, wherein the pixel electrode includes a first pixel electrode aligned in the first area and a second pixel electrode aligned in the second area.

19. The liquid crystal display device of claim 18, wherein at least one of the first and second pixel electrodes has at least one recess at an area corresponding to the storage electrode.

20. The liquid crystal display device of claim 18, wherein the insulating layer pattern has a first opening at the first area corresponding to the storage electrode and a second opening at the second area corresponding to the storage electrode.

21. The liquid crystal display device of claim 13, wherein the first and second pixel electrodes are inclined relative to a lengthwise direction of the storage electrode and oriented symmetrically to each other.

22. The liquid crystal display device of claim 13, wherein the insulating layer pattern comprises an organic insulating layer.

23. The liquid crystal display device of claim 22, wherein the organic insulating layer defines the opening at each pixel area.

* * * * *